United States Patent
Kasuya et al.

(10) Patent No.: US 11,313,279 B2
(45) Date of Patent: Apr. 26, 2022

(54) SCROLL AND GAS TURBINE FACILITY

(71) Applicant: TOSHIBA ENERGY SYSTEMS & SOLUTIONS CORPORATION, Kawasaki (JP)

(72) Inventors: Hiroki Kasuya, Yokohama (JP); Masao Itoh, Yokohama (JP); Yuichi Morisawa, Yokohama (JP); Yasunori Iwai, Yokohama (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 16/920,923

(22) Filed: Jul. 6, 2020

(65) Prior Publication Data
US 2021/0010422 A1    Jan. 14, 2021

(30) Foreign Application Priority Data

Jul. 8, 2019   (JP) .............................. JP2019-126870
May 13, 2020  (JP) .............................. JP2020-084261

(51) Int. Cl.
*F02C 7/143*   (2006.01)
*F02C 3/06*    (2006.01)

(52) U.S. Cl.
CPC ............... *F02C 7/143* (2013.01); *F02C 3/06* (2013.01); *F05D 2220/32* (2013.01); *F05D 2260/20* (2013.01)

(58) Field of Classification Search
CPC .. F02C 7/12; F02C 7/143; F01D 9/023; F05D 2260/20
See application file for complete search history.

(56) References Cited

U.S. PATENT DOCUMENTS

| 7,007,475 B2 * | 3/2006 | Nguyen ................. F23R 3/425 415/205 |
| 2009/0199568 A1 * | 8/2009 | Schumacher ........... F01D 9/023 60/806 |

FOREIGN PATENT DOCUMENTS

| JP | 2-105548 U | 8/1990 |
| JP | 11-303648 A | 11/1999 |

* cited by examiner

*Primary Examiner* — Steven M Sutherland
(74) *Attorney, Agent, or Firm* — Oblon, McClelland, Maier & Neustadt, L.L.P.

(57) ABSTRACT

An entire scroll is effectively cooled. A scroll of an embodiment leads combustion gas to a turbine stage as a working medium for driving a turbine rotor in a gas turbine facility, and includes a scroll inner cylinder and a scroll outer cylinder. The working medium flows into the scroll inner cylinder. The scroll outer cylinder is provided to cover the scroll inner cylinder with a scroll cooling flow path therebetween where a cooling medium with a temperature lower than the working medium is supplied. The scroll cooling flow path includes an inner ring side flow path part located inside than the scroll inner cylinder in a radial direction of the turbine rotor and an outer ring side flow path part located outside than the scroll inner cylinder in the radial direction of the turbine rotor. Here, a dividing part dividing the outer ring side flow path part in an axial direction along a rotation axis of the turbine rotor is provided at the scroll inner cylinder.

10 Claims, 14 Drawing Sheets

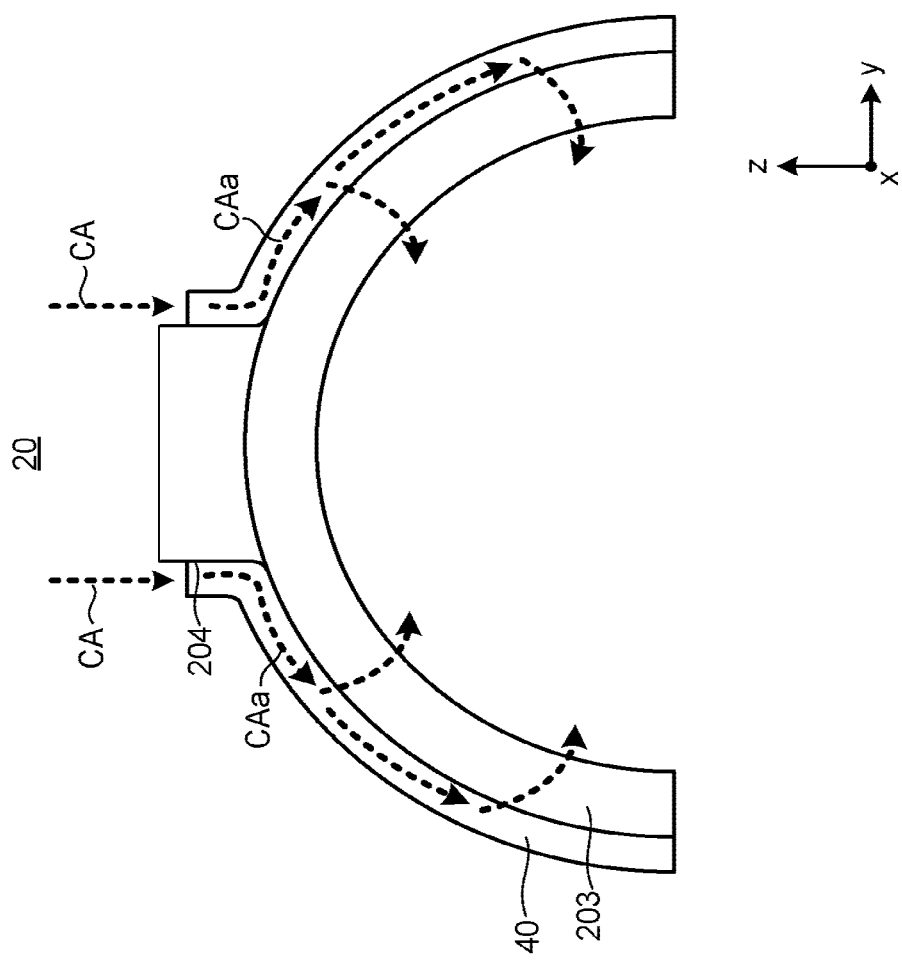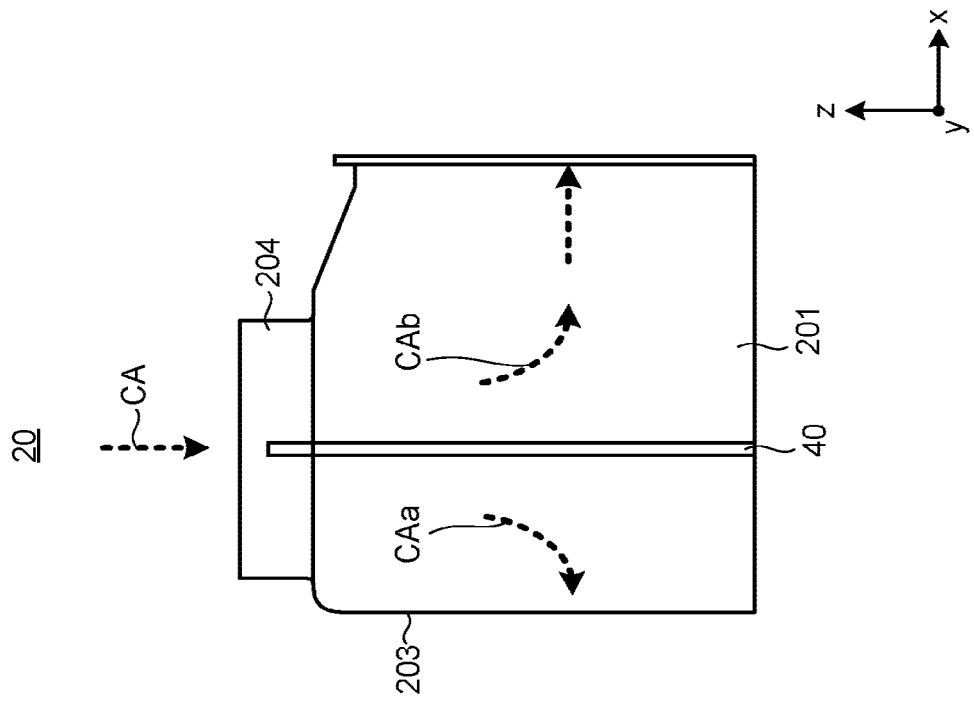

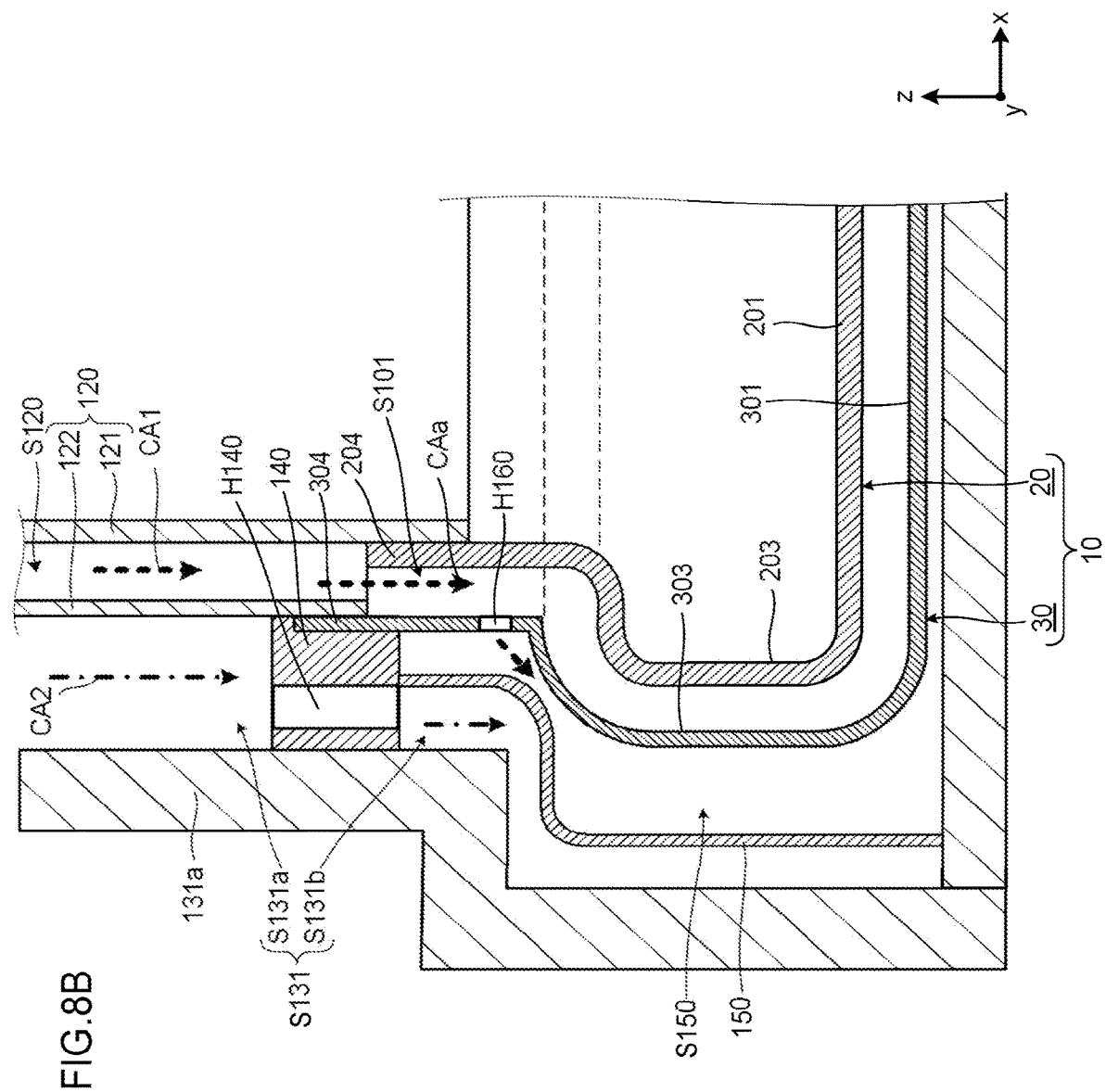

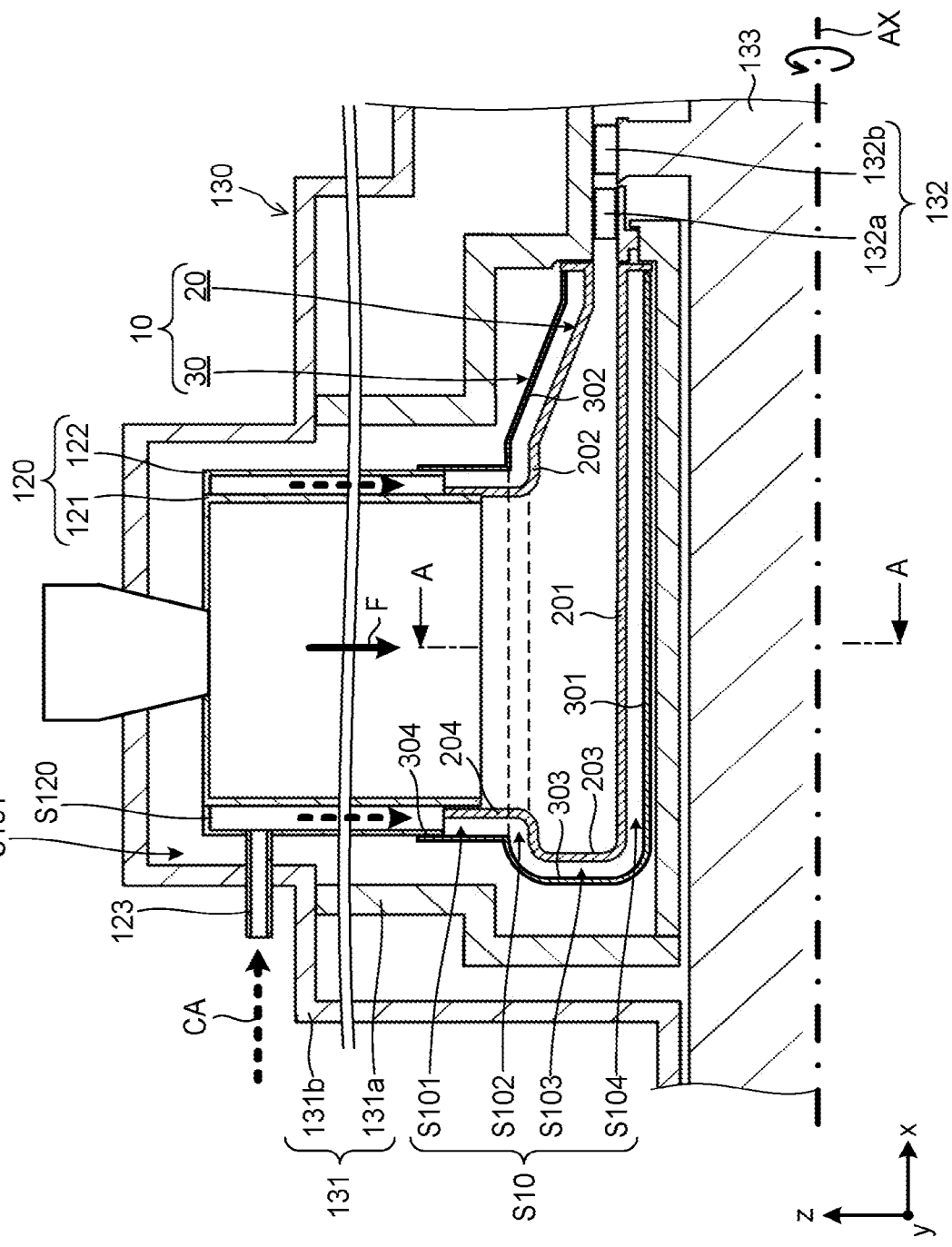

SCROLL AND GAS TURBINE FACILITY

CROSS REFERENCE TO RELATED APPLICATIONS

This application is based upon and claims the benefit of priority from Japanese Patent Application (Patent Application No. 2019-126870), filed on Jul. 8, 2019 and Japanese Patent Application (Patent Application No. 2020-084261), filed on May 13, 2020; the entire contents of which are incorporated herein by reference.

FIELD

Embodiments of the present invention relate to a scroll and a gas turbine facility.

BACKGROUND

In a gas turbine facility, combustion gas produced in a combustor is introduced into a first turbine stage as a working medium, for example, via a scroll. In the gas turbine facility, the scroll is cooled by a cooling medium as hot combustion gas passes therethrough.

Various techniques have been proposed for cooling the scroll. For example, it has been proposed that the scroll can be cooled by cooling methods such as impingement cooling and convection cooling, using the air emitted from a compressor as a cooling medium. However, it is not easy to increase cooling efficiency sufficiently, and it may be difficult to effectively cool an entire scroll.

In particular, when the gas turbine facility is a $CO_2$ turbine facility and the working medium is high-pressure combustion gas, the scroll needs to be made thicker to prevent deformation and thermal resistance increases, making it difficult to cool the scroll sufficiently. Specifically, it may not be easy to reduce a surface temperature of a combustion gas side of the scroll sufficiently because a difference between a surface temperature of the combustion gas side with high temperature and a surface temperature of the cooling medium side with low temperature becomes large in the scroll.

An example of a gas turbine facility 100J according to a related art is explained by using FIG. 10A and FIG. 10B.

In FIG. 10A and FIG. 10B, a z-direction is a vertical direction, an x-direction is a first horizontal direction, and a y-direction is a second horizontal direction orthogonal to the x-direction and the z-direction. FIG. 10A schematically illustrates a part of a cross-section along a vertical plane (xz plane). FIG. 10B schematically illustrates an A-A portion in FIG. 10A of a cross-section along another vertical plane (yz plane) orthogonal to the vertical plane (xz plane) of FIG. 10A. In FIG. 10A and FIG. 10B, an upper half side is illustrated and a lower half side is omitted, but the lower half side is formed in the same way as the upper half side. In FIG. 10A and FIG. 10B, a thick solid arrow indicates a flow of a working medium F and a thick dashed-line arrow indicates a flow of a cooling medium CA. Due to the convenience of illustration, a dimension ratio between each diagram has been changed as appropriate.

As illustrated in FIG. 10A and FIG. 10B, the gas turbine facility 100J includes a combustor 120 and a turbine part 130 where a turbine rotor 133 rotates when combustion gas produced in the combustor 120 is introduced into a turbine stage 132 via a scroll 10 as the working medium F. The gas turbine facility 100J is, for example, a $CO_2$ turbine facility, and the working medium F contains, for example, $CO_2$ gas in a supercritical state, and the cooling medium CA contains, for example, $CO_2$ gas supplied from a regenerative heat exchanger (not illustrated).

Respective parts that form the gas turbine facility 100J are described in turn.

In the gas turbine facility 100J, the combustor 120 includes a combustor inner cylinder 121 and a combustor outer cylinder 122.

The combustor inner cylinder 121 has a tubular body, and a tube axis is set along a radial direction of the turbine rotor 133. In the inside of the combustor inner cylinder 121, combustion gas is produced by supply of fuel and oxygen to generate combustion.

The combustor outer cylinder 122 has a tubular body whose inner diameter is larger than an outer diameter of the combustor inner cylinder 121 and is installed coaxially with the combustor inner cylinder 121. The combustor outer cylinder 122 is installed to cover a circumference of the combustor inner cylinder 121 through a combustor cooling flow path S120. Here, a cooling medium supply pipe 123 is installed on an outer peripheral surface of the combustor outer cylinder 122, and the cooling medium CA, which is lower in temperature than the working medium F being the combustion gas, is configured to flow into the inside of the combustor cooling flow path S120 from the outside through the cooling medium supply pipe 123 to cool the combustor 120.

In the gas turbine facility 100J, the turbine part 130 includes a turbine casing 131 and the turbine rotor 133.

The turbine casing 131 has an inner casing 131a and an outer casing 131b, including a portion where the inner casing 131a is accommodated inside the outer casing 131b.

The turbine rotor 133 has a cylindrical rod-shaped body and is accommodated inside the turbine casing 131 so that an axial direction where a rotation axis AX extends is set along the first horizontal direction x. The turbine rotor 133 is configured to be connected to a generator (not illustrated), and rotation of the turbine rotor 133 drives the generator (not illustrated) to generate electricity.

Inside the turbine casing 131, the turbine stage 132 having stator blades 132a and rotor blades 132b is provided. In the turbine stage 132, the stator blades 132a are installed in the inner casing 131a forming the turbine casing 131. The stator blades 132a are plural, and the plurality of stator blades 132a are arranged in a circumferential direction of the turbine rotor 133 to form a stator blade cascade. In turbine stage 132, the rotor blades 132b are installed on an outer peripheral surface of the turbine rotor 133. The rotor blades 132b are plural, and the plurality of rotor blades 132b are arranged in the circumferential direction of the turbine rotor 133 to form a rotor blade cascade. Although not illustrated, the stator blade cascades and the rotor blade cascades are arranged alternately in the axial direction of the turbine rotor 133. That is, the turbine part 130 is a multistage type, and the turbine stages 132 each including the stator blade cascades and the rotor blade cascades are arranged in plural along the rotation axis AX.

In addition to the above, the scroll 10 is installed inside the turbine casing 131. The scroll 10 is installed to lead the combustion gas produced in the combustor 120 to a first turbine stage 132 as the working medium F. The scroll 10 is accommodated in an accommodation space S131 (combustor and scroll accommodation space) divided by the inner casing 131a and the outer casing 131b together with the combustor 120, and connected to the combustor 120.

The scroll 10 is a double structure including a scroll inner cylinder 20 and a scroll outer cylinder 30.

In the scroll 10, the scroll inner cylinder 20 is connected to the combustor inner cylinder 121 and is configured so that the combustion gas is supplied from the combustor inner cylinder 121 as the working medium F.

Specifically, the scroll inner cylinder 20 has an inner cylinder inner ring part 201 and an inner cylinder outer ring part 202, and an inner space intervenes between the inner cylinder inner ring part 201 and the inner cylinder outer ring part 202.

The inner cylinder inner ring part 201 has a tubular body and is installed coaxially with the turbine rotor 133. The inner cylinder inner ring part 201 is provided along the axial direction of the turbine rotor 133.

The inner cylinder outer ring part 202 has a tubular body whose inner diameter is larger than an outer diameter of the inner cylinder inner ring part 201 and is installed coaxially with the turbine rotor 133 as same as the inner cylinder inner ring part 201. The inner cylinder outer ring part 202 is located on an outer side than the inner cylinder inner ring part 201 in the radial direction of the turbine rotor 133. A portion of the inner cylinder outer ring part 202 that is farther from the turbine stage 132 in the axial direction of the turbine rotor 133 is along the axial direction of the turbine rotor 133. On the other hand, a portion of the inner cylinder outer ring part 202 that is closer to the turbine stage 132 in the axial direction of the turbine rotor 133 is inclined in the axial direction of the turbine rotor 133 to be closer to the outer peripheral surface of the turbine rotor 133 as it is closer to the turbine stage 132.

In the scroll inner cylinder 20, the inner cylinder inner ring part 201 and the inner cylinder outer ring part 202 are connected via an inner cylinder side plate part 203. The inner cylinder side plate part 203 has a plate-shaped body including a portion along the radial direction of the turbine rotor 133 and is provided on the other end side opposite to one end side where the turbine stage 132 is located in the axial direction of the turbine rotor 133.

An inner cylinder introduction pipe part 204 is installed in the inner cylinder outer ring part 202. The inner cylinder introduction pipe part 204 has a tubular body and is installed such that a tube axis is set along the radial direction of the turbine rotor 133 as same as the combustor outer cylinder 121, and the combustor inner cylinder 121 is inserted into the inner cylinder introduction pipe part 204. An inner space of the inner cylinder introduction pipe part 204 is connected to an inner space intervening between the inner cylinder inner ring part 201 and the outer cylinder outer ring part 202.

In the scroll inner cylinder 20, the combustion gas is supplied from the combustor inner cylinder 121 to the inner cylinder introduction pipe part 204, and after flowing through the inner space between the inner cylinder inner ring part 201 and the inner cylinder outer cylinder part 202, it is discharged from an outlet into the turbine stage 132 as the working medium F.

In the scroll 10, the scroll outer cylinder 30 is provided to cover the scroll inner cylinder 20 with a scroll cooling flow path S10 therebetween. The scroll 10 is configured to be cooled by introducing the cooling medium CA, which has a temperature lower than the working medium F being the combustion gas, into the scroll cooling flow path S10 after passing through the combustor cooling flow path S120.

Specifically, the scroll outer cylinder 30 has an outer cylinder inner ring part 301 and an outer cylinder outer ring part 302 and is configured so that an inner space intervenes between the outer cylinder inner ring part 301 and the outer cylinder outer ring part 302.

The outer cylinder inner ring part 301 has a tubular body whose outer diameter is smaller than the inner diameter of the inner cylinder inner ring part 201 and is installed coaxially with the turbine rotor 133. The outer cylinder inner ring part 301 is provided along the axial direction of the turbine rotor 133. A portion of the inner casing 131a that surrounds the outer peripheral surface of the turbine rotor 133 is interposed between an inner peripheral surface of the outer cylinder inner ring part 301 and an outer peripheral surface of the turbine rotor 133.

The outer cylinder outer ring part 302 has a tubular body whose inner diameter is larger than the outer cylinder inner ring part 301 and the inner cylinder outer ring part 202 and is installed coaxially with the turbine rotor 133 as is the case with the outer cylinder inner ring part 301. The outer cylinder outer ring part 302 is located on an outer side than the outer cylinder inner ring part 301 in the radial direction of the turbine rotor 133. A portion of the outer cylinder outer ring part 302 that is farther from the turbine stage 132 in the axial direction of the turbine rotor 133 is along the axial direction of the turbine rotor 133. On the other hand, a portion of the outer cylinder outer ring part 302 that is close to the turbine stage 132 in the axial direction of the turbine rotor 133 is inclined in the axial direction of the turbine rotor 133 to be closer to the outer peripheral surface of the turbine rotor 133 as it is closer to the turbine stage 132.

In the scroll outer cylinder 30, the outer cylinder inner ring part 301 and the outer cylinder outer ring part 302 are connected via an outer cylinder side plate part 303. The outer cylinder side plate part 303 has a plate-shaped body including a portion along the radial direction of the turbine rotor 133 and is provided on the other end side, which is opposite to one end side where the turbine stage 132 is located in the axial direction of the turbine rotor 133.

An outer cylinder introduction pipe part 304 is installed in the outer cylinder outer ring part 302. The outer cylinder introduction pipe part 304 has a tubular body whose inner diameter is larger than an outer diameter of the inner cylinder introduction pipe part 204, is installed such that a tube axis is set along the radial direction of the turbine rotor 133 as same as the combustor outer cylinder 122, and the combustor outer cylinder 122 is inserted into the outer cylinder introduction pipe part 304. An inner space of the outer cylinder introduction pipe part 304 is connected to am inner space intervening between the outer cylinder inner ring part 301 and the outer cylinder outer ring part 302.

In the scroll 10, the scroll cooling flow path S10 includes an introduction flow path part S101, an outer ring side flow path part S102, a side surface side flow path part S103, and an inner ring side flow path part S104, and is configured in so that the cooling medium CA flows through each part.

Specifically, the introductory flow path part S101 is a space intervening between the inner cylinder introduction pipe part 204 and the outer cylinder introduction pipe part 304, which is along the radial direction of the turbine rotor 133. The outer ring side flow path part S102 is a space intervening between the inner cylinder outer ring part 202 and the outer cylinder outer ring part 302, is located on an outer side than the scroll inner cylinder 20 in the radial direction of the turbine rotor 133, and along the axial direction of the turbine rotor 133. The side surface side flow path part S103 is a space intervening between the inner cylinder side plate part 203 and the outer cylinder side plate part 303 and along the radial direction of the turbine rotor 133. The inner ring side flow path part S104 is a space intervening between the inner cylinder inner ring part 201 and the outer cylinder inner ring part 301, is located on an inner side than the scroll inner cylinder 20 in the radial direction of the turbine rotor 133, and along the axial direction of the turbine rotor 133.

In the scroll cooling flow path S10, the cooling medium CA is first introduced into the introduction flow path part S101 from the combustor cooling flow path S120. Next, the cooling medium CA is introduced into the outer ring side flow path part S102 from the introduction flow path part S101. A part of the cooling medium CA introduced into the outer ring-side flow path part S102 is introduced into the inner ring side flow path part S104 via the side surface side flow path part S103, used for cooling a portion of the scroll 10 located inside in the radial direction, and the remainder is used for cooling a portion of the scroll 10 located outside in the radial direction.

Cooling of the scroll 10 is performed by cooling methods such as convection cooling, serpentine cooling, impingement cooling, cooling using ribs, pin fins, dimples, effusion cooling, slot film cooling, film cooling, shower head cooling, transpiration cooling, and the like, and combinations thereof.

Although not illustrated, the cooling medium CA, after being used for cooling in the scroll cooling flow path S10, flows into the scroll inner cylinder 20 from the scroll cooling flow path S10 through a through-hole (not illustrated) formed at the scroll inner cylinder 20, for example, and is mixed with the combustion gas.

The cooling medium CA flowing through the scroll cooling flow path S10 is further explained by using FIG. 11A and FIG. 11B.

FIG. 11A and FIG. 11B each illustrate an upper half of the scroll inner cylinder 20 in the scroll 10 and the flow of the cooling medium CA by dashed arrows. FIG. 11A schematically illustrates a part of a side surface along the vertical plane (xz plane), where a left side is an upstream side of the working medium F (a side far from the turbine stage 132) and a right side is a downstream side of the working medium F (a side close to the turbine stage 132). FIG. 11B schematically illustrates a part of a side surface along another vertical plane (yz plane) orthogonal to the vertical plane (xz plane) of FIG. 11A, where an inner side of an arc is an inner side in the radial direction (inner ring side) and an outer side of the arc is an outer side in the radial direction (outer ring side).

As mentioned above, the cooling medium CA is introduced into a portion of the scroll inner cylinder 20 that is located outside the inner cylinder introduction pipe part 204 (corresponding to the introduction flow path part S101 in FIG. 10A and FIG. 10B). Then, the cooling medium CA flows through a portion located on an outer ring side of the inner cylinder outer ring part 202 (corresponding to the outer ring side flow path part S102 in FIG. 10A and FIG. 10B). Thereafter, the cooling medium CA flows through a portion located on an inner ring side in the inner cylinder inner ring part 201 (corresponding to the inner ring side flow path part S104 in FIG. 10A and FIG. 10B) through a portion located outside the inner cylinder side plate part 203 (corresponding to the side surface side flow path part S103 in FIG. 10A and FIG. 10B).

In the scroll 10, the cooling medium CA flows in the outer portion of the inner cylinder introduction pipe part 204 (outer ring side flow path part S102) before the inner ring side portion of the inner cylinder inner ring part 201 (inner ring side flow path part S104). As a result, the inner ring portion of the inner cylinder inner ring part 201 (inner ring side flow path part S104) may not be sufficiently cooled.

Thus, the problem to be solved by the present invention is to provide a scroll and a gas turbine facility that can be effectively cooled for the entirety of the scroll.

BRIEF DESCRIPTION OF THE DRAWINGS

FIG. 2A is a diagram schematically illustrating a substantial part of a scroll inner cylinder in a scroll of the gas turbine facility according to the first embodiment.

FIG. 2B is a diagram schematically illustrating the substantial part of the scroll inner cylinder in the scroll of the gas turbine facility according to the first embodiment.

FIG. 8B is a diagram illustrating the substantial part of the gas turbine facility according to the fifth embodiment.

FIG. 10A is a diagram illustrating a substantial part of a gas turbine facility according to a related art.

DETAILED DESCRIPTION

A scroll of an embodiment is a scroll that leads combustion gas to a turbine stage as a working medium for driving a turbine rotor in a gas turbine facility, and includes a scroll inner cylinder and a scroll outer cylinder. The working medium flows into the scroll inner cylinder. The scroll outer cylinder is provided to cover the scroll inner cylinder with a scroll cooling flow path therebetween where a cooling medium with a temperature lower than the working medium is supplied. The scroll cooling flow path includes an inner ring side flow path part located on an inner side than the scroll inner cylinder in a radial direction of the turbine rotor, and an outer ring side flow path part located on an outer side than the scroll inner cylinder in the radial direction of the turbine rotor. Here, a dividing part is provided at the scroll inner cylinder that divides the outer ring side flow path part in an axial direction along a rotation axis of the turbine rotor.

First Embodiment

[Configuration]

Figure 1A:
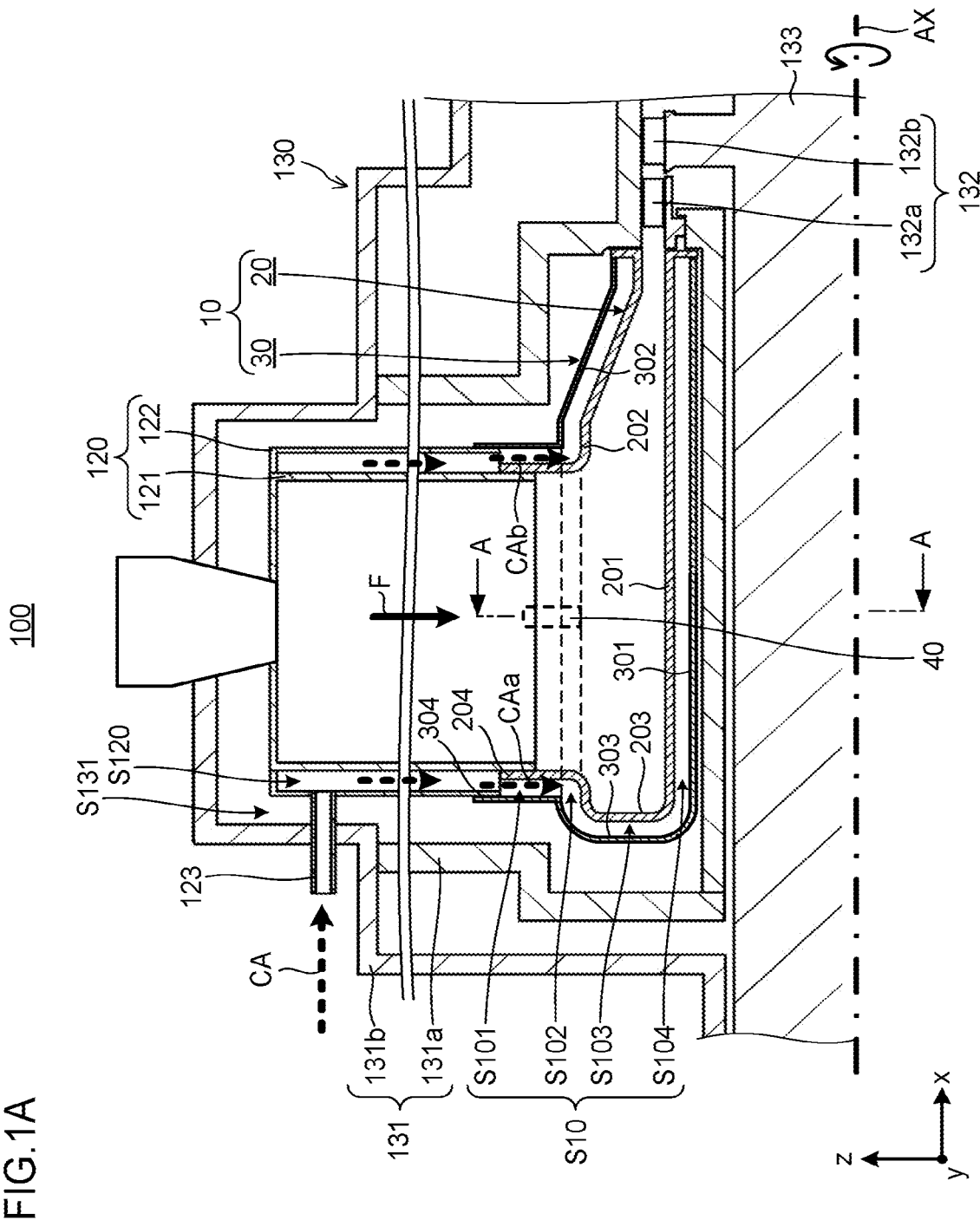
FIG. 1A is a diagram illustrating a substantial part of a gas turbine facility according to a first embodiment.
Figure 1B:
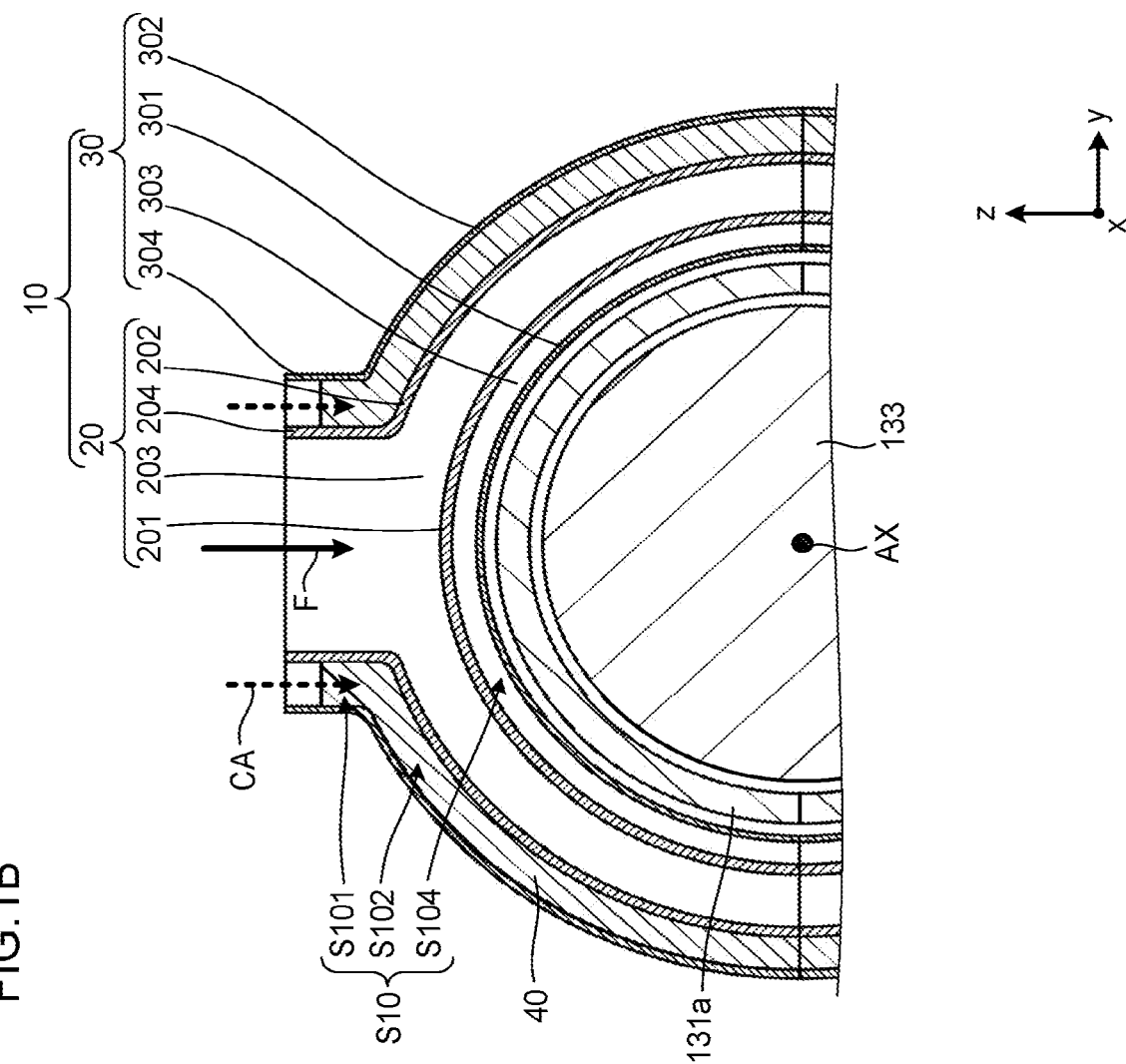
FIG. 1B is a diagram illustrating the substantial part of the gas turbine facility according to the first embodiment.

A gas turbine facility 100 according to a first embodiment is explained by using FIG. 1A and FIG. 1B.

FIG. 1A schematically illustrates a part of a cross-section along a vertical plane (xz plane), as in FIG. 10A. FIG. 1B schematically illustrates an A-A portion in FIG. 1A of a cross-section along another vertical plane (yz plane) orthogonal to the vertical plane (xz plane) of FIG. 1A.

Figure 10B:
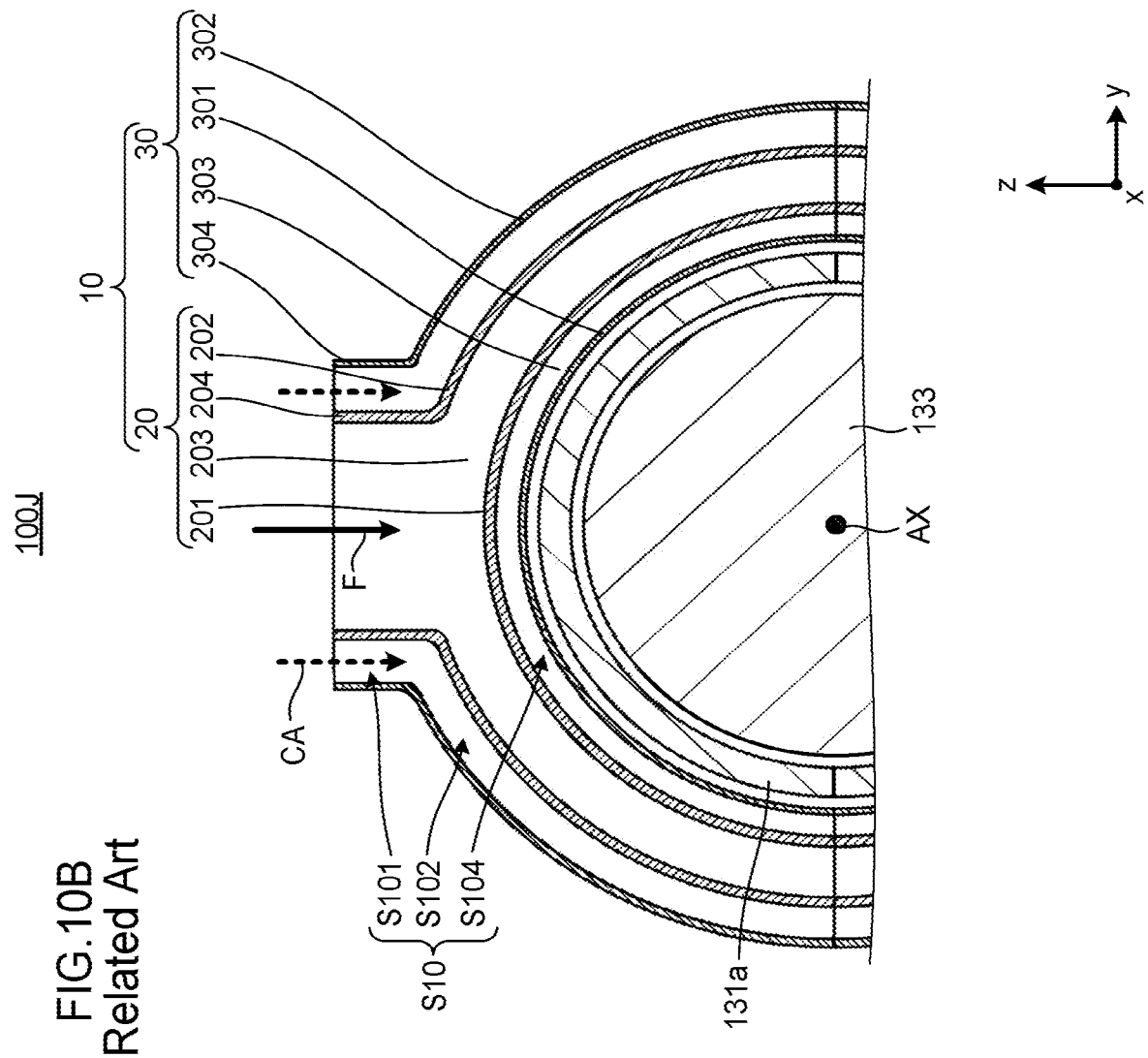
FIG. 10B is a diagram illustrating the substantial part of the gas turbine facility according to the related art.

As illustrated in FIG. 1A and FIG. 1B, the gas turbine facility 100 of this embodiment is provided with a scroll 10 that leads combustion gas to a turbine stage 132 as a working medium F for driving a turbine rotor 133 in the gas turbine facility 100, as in the case of the above-mentioned related art (refer to FIG. 10A and FIG. 10B). The scroll 10 has a scroll inner cylinder 20 and a scroll outer cylinder 30. The scroll inner cylinder 20 includes an inner cylinder inner ring part 201, an inner cylinder outer ring part 202, an inner cylinder side plate part 203, and an inner cylinder introduction pipe part 204 to allow the working medium F to flow into the scroll inner cylinder 20. The scroll outer cylinder 30 includes an outer cylinder inner ring part 301, an outer cylinder outer ring part 302, an outer cylinder side plate part 303, and an outer cylinder introduction pipe part 304, and is provided to cover the scroll inner cylinder 20 with a scroll cooling flow path S10 therebetween where a cooling medium CA with a temperature lower than the working medium F is supplied. The scroll cooling flow path S10 includes an introduction flow path part S101, an outer ring side flow path part S102, a side surface side flow path part S103, and an inner ring side flow path part S104, and is configured so that the cooling medium CA flows through each part.

However, in this embodiment, the scroll 10 is provided with a dividing part 40, unlike in the case of the above-mentioned related art. Except in this and related respects, this embodiment is similar to the case of the related art described above. For this reason, overlapping items are omitted from the explanation as appropriate.

In the scroll 10 of this embodiment, the dividing part 40 is provided at the scroll inner cylinder 20 to divide the introduction flow path part S101 and the outer ring side flow path part S102 in an axial direction along a rotation axis AX of the turbine rotor 133.

In this embodiment, the dividing part 40 has a plate-shaped body and is installed so that a plate surface is set along a radial direction of the turbine rotor 133 between the outer cylinder introduction pipe part 304 and the inner cylinder introduction pipe part 204, and between the inner cylinder outer ring part 202 and the outer cylinder outer ring part 302. That is, the dividing part 40 is installed so that the axial direction of the turbine rotor 133 is orthogonal to the plate surface of the dividing part 40.

In this embodiment, the dividing part 40 is provided at a portion where a tube axis of the inner cylinder introduction pipe part 204 and a tube axis of the outer cylinder introduction pipe part 304 are located in the axial direction of the turbine rotor 133. The dividing part 40 is configured by combining a member on an upper half side and a member on a lower half side, as same as respective parts that form the scroll inner cylinder 20.

In the outer ring side flow path part S102, the dividing part 40 has an arc shape along a rotation direction of the turbine rotor 133, an inner diameter of the arc-shaped portion is the same as an outer diameter of the inner cylinder outer ring part 202, and an outer diameter of the arc shape is the same as an inner diameter of the outer cylinder outer ring part 302.

In this embodiment, when making the scroll 10, the scroll 10 is completed by assembling the scroll outer cylinder 30 after assembling the scroll inner cylinder 20 having the dividing part 40.

[Flow of Cooling Medium CA]

In this embodiment, the cooling medium CA flowing through the scroll cooling flow path S10 is explained by using FIG. 2A and FIG. 2B as well as FIG. 1A and FIG. 1B.

Figure 11A:
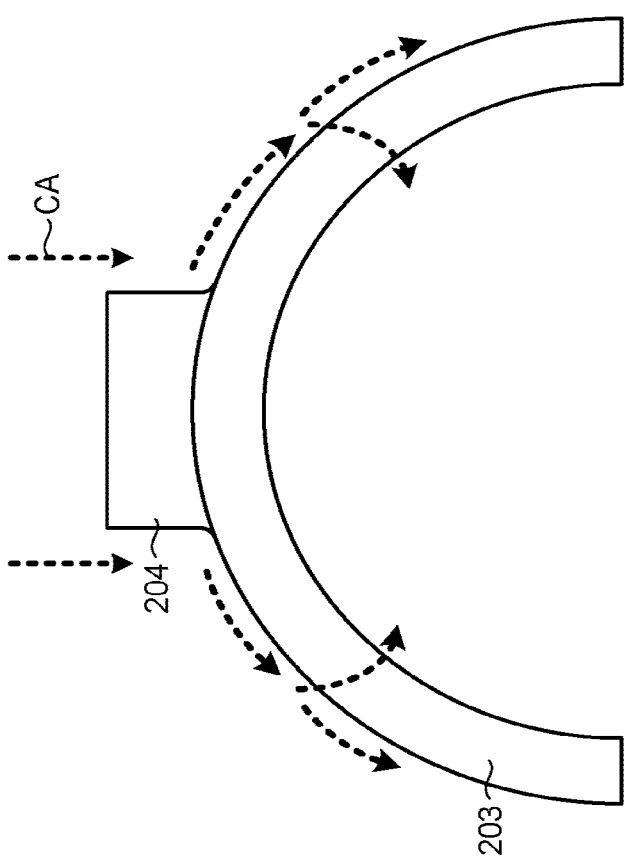
FIG. 11A is a diagram schematically illustrating a substantial part of a scroll inner cylinder in a scroll of a gas turbine facility according to the related art.
Figure 11B:
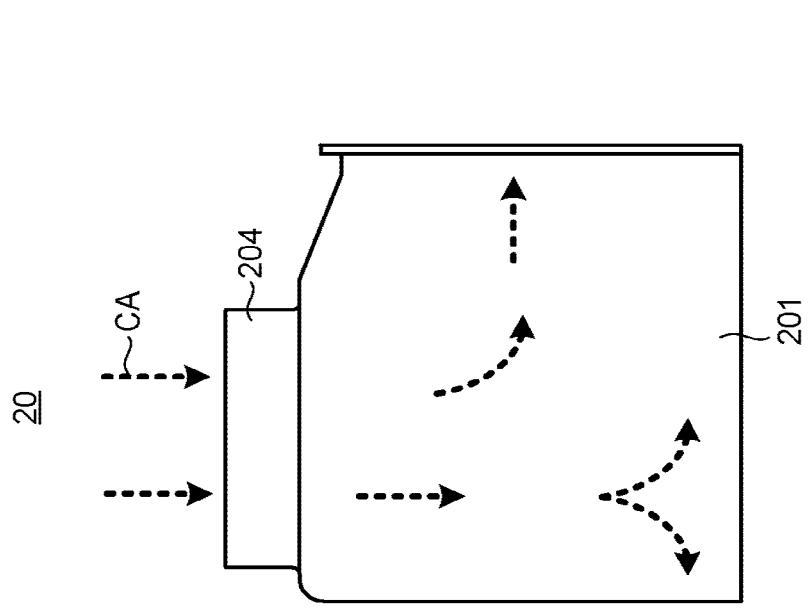
FIG. 11B is a diagram schematically illustrating the scroll inner cylinder before assembly in the scroll of the gas turbine facility according to the related art.

FIG. 2A and FIG. 2B illustrate an upper half portion of the scroll inner cylinder 20 in the scroll 10, as in the case of FIG. 11A and FIG. 11B, and flow of the cooling medium CA is shown by dashed arrows. FIG. 2A schematically illustrates a part of a side surface along the vertical plane (xz plane), where a left side is an upstream side of the working medium F (a side far from the turbine stage 132) and a right side is a downstream side of the working medium F (a side close to the turbine stage 132), as in FIG. 11A. FIG. 2B schematically illustrates a part of a side surface along another vertical plane (yz plane) orthogonal to the vertical plane (xz plane) of FIG. 2A, where an inner side of an arc is an inner side in the radial direction (inner ring side) and an outer side of the arc is an outer side in the radial direction (outer ring side).

In this embodiment, when the cooling medium CA is introduced into the introduction flow path part S101, it is introduced into a portion of the scroll inner cylinder 20, which is located outside the inner cylinder introduction pipe part 204. Next, when the cooling medium CA flows through the outer ring side flow path part S102, it flows through a portion of the inner cylinder outer ring part 202 located on the outer ring side.

In this embodiment, the portion of the inner cylinder outer ring part 202 located on the outer ring side (outer ring side flow path part S102) is divided by the dividing part 40 in the axial direction along the rotation axis AX of the turbine rotor 133. That is, the dividing part 40 divides the outer ring side flow path part S102 into a space located on the upstream side (left side in FIG. 2A) of the working medium F and a space located on the downstream side (right side in FIG. 2A) of the working medium F. Therefore, the cooling medium CA introduced into the outer ring side flow path part S102 flows while branching into the upstream side of the working medium F and the downstream side of the working medium F.

One branched cooling medium CAa, which has branched into the space located on the upstream side of the working medium F in the outer ring side flow path part S102, flows through the side surface side flow path part S103, which is located outside the inner cylinder side plate part 203, into the inner ring side flow path part S104, which is located on the inner ring side of the inner cylinder inner ring part 201. An inner portion of the scroll 10 in the radial direction is thereby cooled.

On the other hand, the space located on the downstream side of the working medium F in the outer ring side flow path part S102 is not connected to the inner ring side flow path part S104. Accordingly, the other branched cooling medium CAb, which has branched into the space located on the downstream side of the working medium F in the outer ring side flow path part S102 flows through the outer ring side flow path part S102 as it is. An outer portion of the scroll 10 in the radial direction is thereby cooled.

Although not illustrated, the cooling medium CA, after being used for cooling in the scroll cooling flow path S10, flows into the scroll inner cylinder 20 from the scroll cooling flow path S10 through a through-hole formed at the scroll inner cylinder 20 (not illustrated), for example, and is mixed with combustion gas.

[Operation and Effect]

As mentioned above, in the scroll 10 of this embodiment, the dividing part 40, that divides the outer ring side flow path part S102 in the axial direction along the rotation axis AX of the turbine rotor 133, is provided at the scroll inner cylinder 20. For this reason, the cooling medium CA flows while branching into the inner ring side flow path part S104 located inside in the radial direction, and the outer ring side flow path part S102 located outside in the radial direction, using the dividing part 40. As a result, in this embodiment, it is possible to sufficiently supply the cooling medium CA to the inner ring side flow path part S104 more than in the case of the above-mentioned related art. Therefore, in this embodiment, reliability of the scroll 10 can be improved because the portion located outside in the radial direction in the scroll 10 and the portion located inside in the radial direction in the scroll 10 can be effectively cooled.

Modification Example

In the above embodiment, the case where the dividing part 40 is provided so that the plate surface of the dividing part 40 is along the radial direction of the turbine rotor 133 is described but is not limited thereto. The dividing part 40 may be provided so that the plate surface of the dividing part 40 is inclined in the radial direction. In the above embodiment, although the case where the inner cylinder side plate part 203 includes a portion along the radial direction of the turbine rotor 133 is shown as an example, the inner cylinder side plate part 203 and the outer cylinder side plate part 303 may be configured to be inclined in the radial direction, as in the case of the dividing part 40.

Second Embodiment

[Configuration]

Figure 3A:
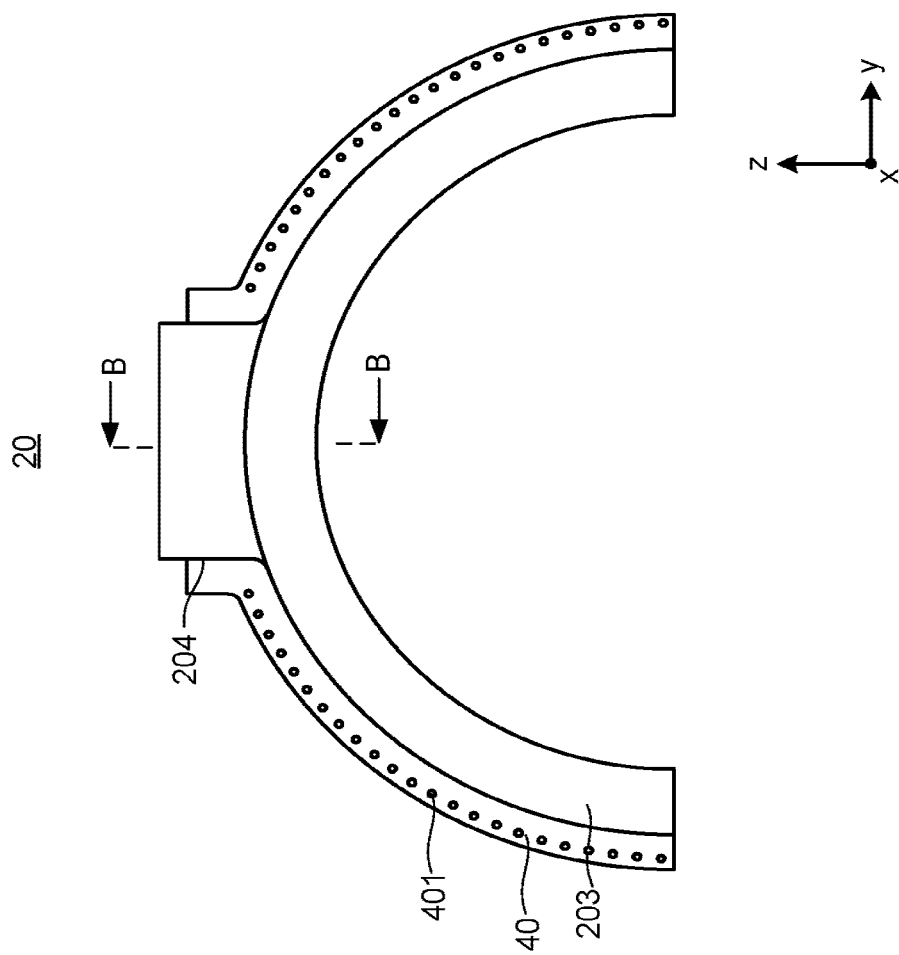
FIG. 3A is a diagram schematically illustrating a substantial part of a scroll inner cylinder in a scroll of a gas turbine facility according to a second embodiment.
Figure 3B:
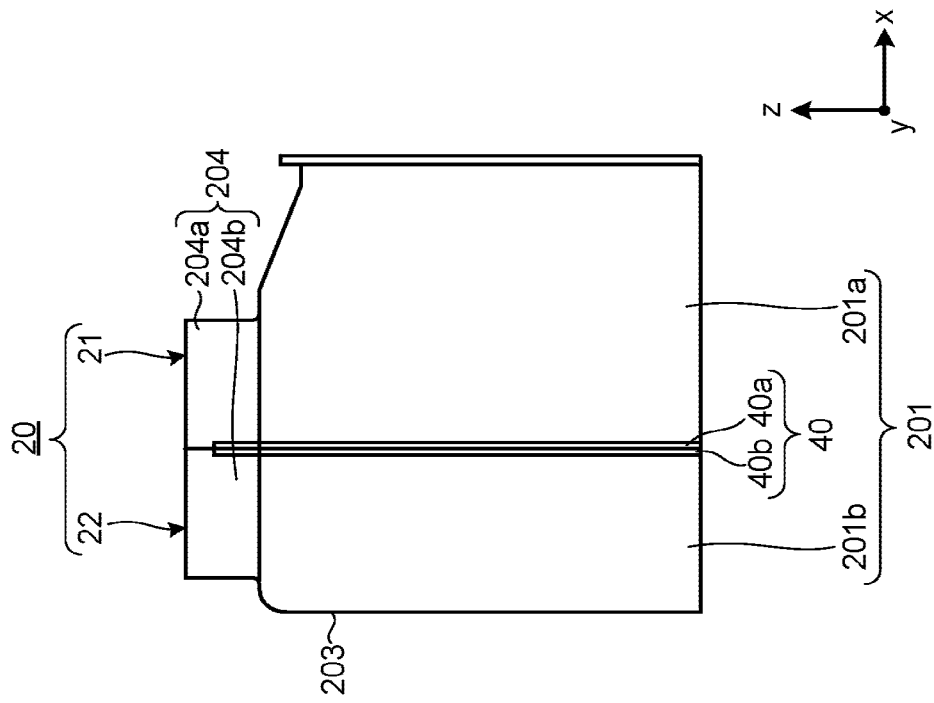
FIG. 3B is a diagram schematically illustrating the substantial part of the scroll inner cylinder in the scroll of the gas turbine facility according to the second embodiment.

The scroll 10 of the gas turbine facility 100 according to a second embodiment is explained by using FIG. 3A and FIG. 3B.

FIG. 3A and FIG. 3B illustrate an upper half part portion of the scroll inner cylinder 20 forming the scroll 10, as in the case of FIG. 2A and FIG. 2B.

The dividing part 40 is provided at the scroll inner cylinder 20 of this embodiment as in the case of the first embodiment.

However, in this embodiment, the scroll inner cylinder 20 can be divided into a first scroll inner cylinder part 21 and a second scroll inner cylinder part 22, and is configured by combining the first scroll inner cylinder part 21 and the second scroll inner cylinder part 22, unlike the case of the above-mentioned first embodiment. Except in this and related respects, this embodiment is similar to the case of the related art described above. For this reason, overlapping items are omitted from the explanation as appropriate.

In the scroll inner cylinder 20 of this embodiment, a first flange part 40a is provided at the first scroll inner cylinder part 21. A second flange part 40b is provided at the second scroll inner cylinder part 22. The dividing part 40 is configured by combining the first flange part 40a and the second flange part 40b.

In this embodiment, the scroll inner cylinder 20 is configured by connecting the first scroll inner cylinder part 21 and the second scroll inner cylinder part 22 using a plurality of bolts 401. Specifically, the scroll inner cylinder 20 is assembled by inserting the plurality of bolts 401 into each of a plurality of through-holes that penetrate both the first flange part 40a and the second flange part 40b and executing fastening work.

Figure 4:
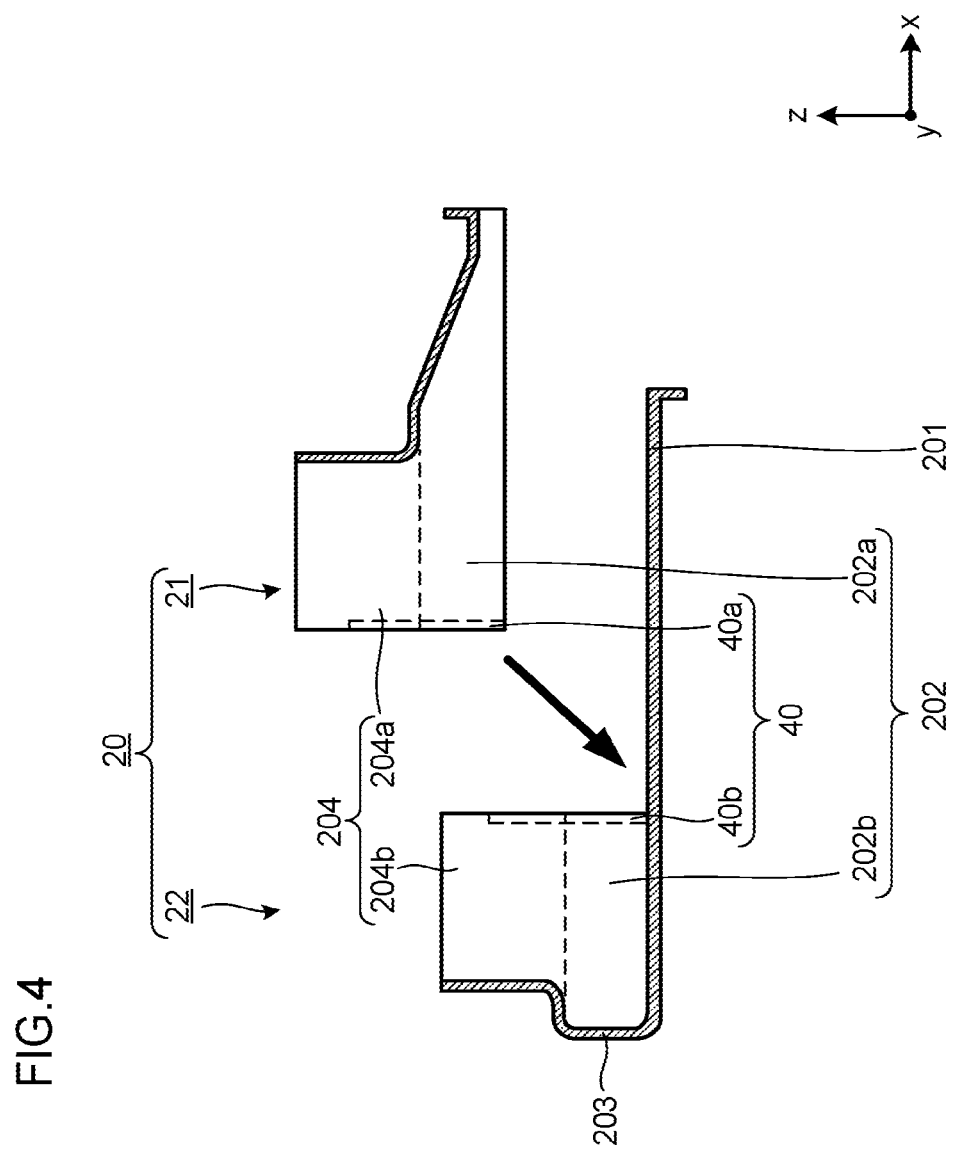
FIG. 4 is a diagram schematically illustrating the scroll inner cylinder before assembly in the scroll of the gas turbine facility according to the second embodiment.

The scroll inner cylinder 20 before assembly is explained by using FIG. 4. FIG. 4 schematically illustrates an appearance of a cross-section of a B-B portion of FIG. 3B when the scroll inner cylinder 20 is divided into the first scroll inner cylinder part 21 and the second scroll inner cylinder part 22.

As illustrated in FIG. 4, the first flange part 40a and the second flange part 40b forming the dividing part 40 correspond to ones where the dividing part 40 is divided at a plane where a tube axis of the inner cylinder introduction pipe part 204 and a tube axis of the outer cylinder introduction pipe part 304 are located among planes orthogonal to the axial direction of the turbine rotor 133.

The inner cylinder outer ring part 202 includes a first inner cylinder outer ring member 202a and a second inner cylinder outer ring member 202b. The first inner cylinder outer ring member 202a and the second inner cylinder outer ring member 202b correspond to ones where the inner cylinder outer ring part 202 is divided at the plane where the tube axis of the inner cylinder introduction pipe part 204 and the tube axis of the outer cylinder introduction pipe part 304 are located among planes orthogonal to the axial direction of the turbine rotor 133.

The inner cylinder introduction pipe part 204 includes a first inner cylinder introduction pipe member 204a and a second inner cylinder introduction pipe member 204b. The first inner cylinder introduction pipe member 204a and the second inner cylinder introduction pipe member 204b correspond to ones where the inner cylinder introduction pipe part 204 is divided at the plane where the tube axis of the inner cylinder introduction pipe part 204 and the tube axis of the outer cylinder introduction pipe part 304 are located among the planes orthogonal to the axial direction of the turbine rotor 133.

In the scroll inner cylinder 20, the first scroll inner cylinder part 21 includes the first inner cylinder outer ring member 202a, the first inner cylinder introduction pipe member 204a, and the first flange part 40a. The second scroll inner cylinder part 22 includes the inner cylinder inner ring part 201, the second inner cylinder outer ring member 202b, the inner cylinder side plate part 203, the second inner cylinder introduction pipe member 204b, and the second flange part 40b.

In this embodiment, the first scroll inner cylinder part 21 and the second scroll inner cylinder part 22 are assembled such that the first inner cylinder outer ring member 202a is combined with the second inner cylinder outer ring member 202b, the first inner cylinder introduction pipe member 204a is combined with the second inner cylinder introduction pipe member 204b, and the first flange part 40a is combined with the second flange part 40b. In this way, the scroll inner cylinder 20 can be fabricated.

[Operation and Effect]

As mentioned above, in this embodiment, the scroll inner cylinder 20 is configured by combining the first scroll inner cylinder part 21 having the first flange part 40a and the second scroll inner cylinder part 22 having the second flange part 40 b. The dividing part 40 is configured by combining the first flange part 40a with the second flange part 40b. Thus, since the scroll inner cylinder 20 of this embodiment is an assembly body of a disassembled plurality of components, it is easy to execute the construction such as a thermal barrier coating on an inner surface of each part under a state before assembly.

Accordingly, in this embodiment, it is possible to perform effective cooling and to further improve the reliability of the scroll 10 by constructing the thermal barrier coating and the like, as in the case of the first embodiment.

Third Embodiment

[Configuration]

Figure 5:
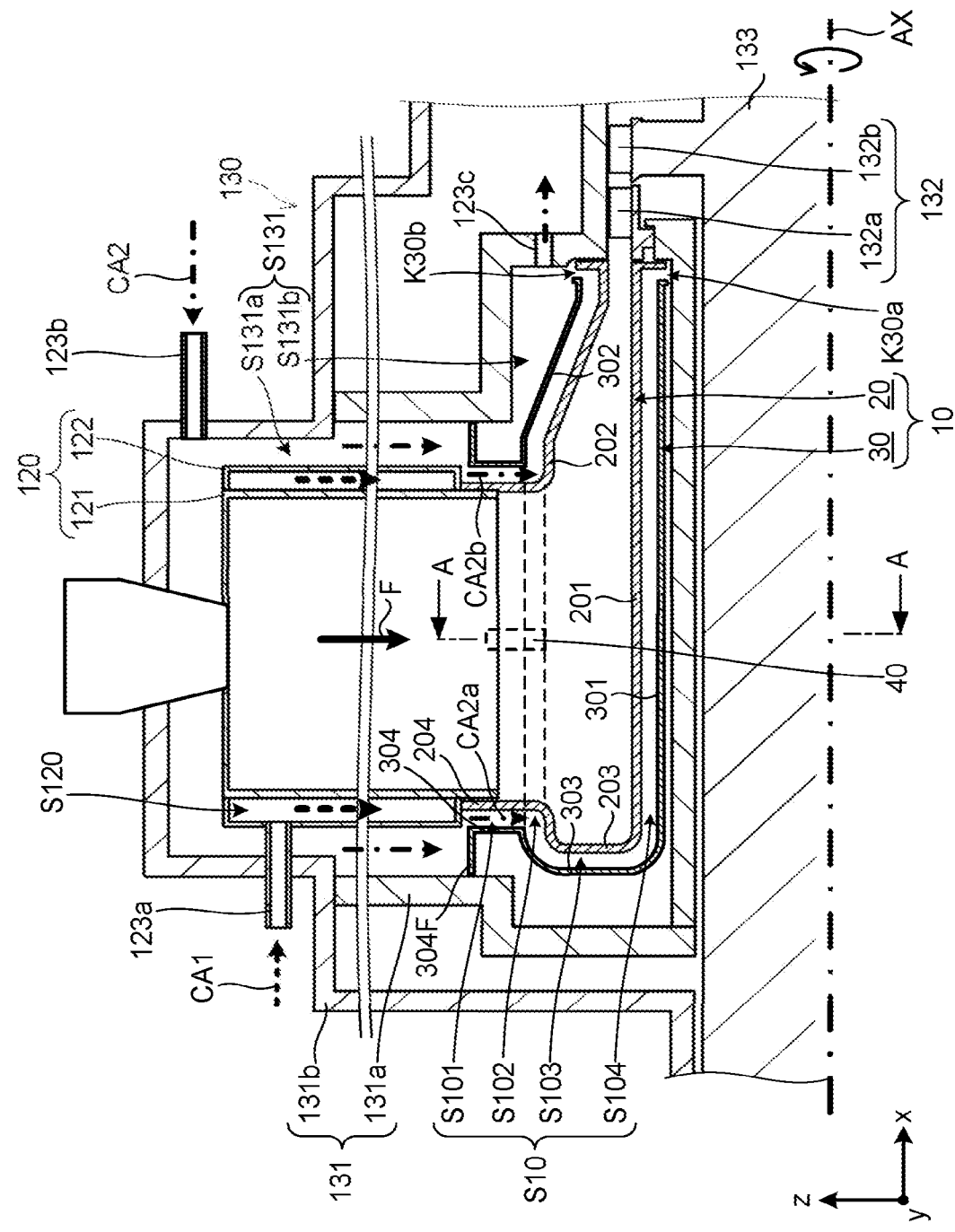
FIG. 5 is a diagram illustrating a substantial part of a gas turbine facility according to a third embodiment.

The gas turbine facility 100 according to a third embodiment is explained by using FIG. 5.

FIG. 5 schematically illustrates a part of a cross-section along the vertical plane (xz plane), as in FIG. 1A.

As illustrated in FIG. 5, the gas turbine facility 100 of this embodiment is configured so that a first cooling medium CA1 (shown in a dashed line) and a second cooling medium CA2 (shown in a dot and dash line) are supplied as the cooling medium CA, unlike the case of the first embodiment (refer to FIG. 1A). Except in this and related respects, this embodiment is similar to the case of the first embodiment. For this reason, overlapping items are omitted from the explanation as appropriate.

In this embodiment, unlike the case of the first embodiment, the accommodation space S131 (combustor and scroll accommodation space) where the combustor 120 and the scroll 10 are accommodated is divided into a first accommodation space part S131a and a second accommodation space part S131b. Specifically, an outer cylinder introduction pipe flow guide part 304F is provided on an outer peripheral surface of the outer cylinder introduction pipe part 304 that is located outside in the radial direction. The outer cylinder introduction pipe flow guide part 304F has a ring plate-shaped body, and the scroll 10 is installed such that the outer peripheral surface of the outer cylinder introduction pipe flow guide part 304F is in contact with an inner peripheral surface of the accommodation space S131 where the combustor 120 and the scroll 10 are accommodated. The accommodation space S131 is thereby divided into a first accommodation space part S131a and a second accommodation space part S131b located on an inner side than the first accommodation space part S131a in the radial direction.

In this embodiment, a first cooling medium supply pipe 123a and a second cooling medium supply pipe 123b are provided, and a cooling medium discharge port 123c is provided. The first cooling medium supply pipe 123a is installed to penetrate the outer casing 131b and is connected to the combustor cooling flow path S120. The second cooling medium supply pipe 123b is installed to penetrate the outer casing 131b and is connected to the first accommodation space part S131a. The cooling medium discharge port 123c is formed in the inner casing 131a and is connected to the second accommodation space part S131b.

In the scroll 10 of this embodiment, cooling medium discharge ports K30a, K30b are provided at one end side located on the turbine stage 132 side in the scroll outer cylinder 30 in addition to the above. Here, in the scroll outer cylinder 30, one cooling medium discharge port K30a is formed at the outer cylinder inner ring part 301 and the other cooling medium discharge port K30b is formed at the outer cylinder outer ring part 302.

[Flows of First Cooling Medium CA1 and Second Cooling Medium CA2]

Details of the first cooling medium CA1 and the second cooling medium CA2 are explained in turn.

In this embodiment, the first cooling medium CA1 is $CO_2$ gas, for example, as in the case of the first embodiment.

The first cooling medium CA1 is supplied from the first cooling medium supply pipe 123a to the combustor cooling flow path S120 intervening between the combustor inner cylinder 121 and the combustor outer cylinder 122 in the combustor 120. In this embodiment, the combustor outer cylinder 122 is not inserted into the outer cylinder introduction pipe part 304, and the combustor cooling flow path S120 is not connected to the scroll cooling flow path S10, unlike the case of the first embodiment. The first cooling medium CA1 is therefore not supplied from the combustor cooling flow path S120 to the scroll cooling flow path S10.

After the first cooling medium CA1 is used for cooling the combustor 120 in the combustor cooling flow path S120, it flows into the combustor inner cylinder 121 from the combustor cooling flow path S120 through a through-hole (not illustrated) formed at the combustor inner cylinder 121, for example, and is mixed with the combustion gas, which is the working medium F.

In this embodiment, the second cooling medium CA2 is $CO_2$ gas, for example, with a temperature lower than the first cooling medium CA1.

The second cooling medium CA2 is first supplied from the second cooling medium supply pipe 123b to the first accommodation space part S131a and flows around the combustor 120. The second cooling medium CA2 flows into the scroll cooling flow path S10 of the scroll 10 from the first accommodation space part S131a. That is, the second cooling medium CA2 is supplied to the scroll cooling flow path S10 of the scroll 10 without passing through the combustor cooling flow path S120.

The scroll cooling flow path S10 includes the introduction flow path part S101, the outer ring side flow path part S102, the side surface side flow path part S103, and the inner ring side flow path part S104, as in the case of the first embodiment, and is configured so that the second cooling medium CA2 flows through each part. The scroll 10 is provided with the dividing part 40, as in the case of the first embodiment. For this reason, the second cooling medium CA2 flows while being branched by the dividing part 40.

That is, one branched cooling medium CA2a, which has branched into a space located on an upstream side of the working medium F in the outer ring side flow path part S102, flows through the side surface side flow path part S103, which is located outside the inner cylinder side plate part 203, into the inner ring side flow path part S104, which is located on the inner ring side of the inner cylinder inner ring part 201. An inner portion in the radial direction of the scroll 10 is thereby cooled. The other branched cooling medium CA2b, which has branched into a space located on a downstream side of the working medium F in the outer ring side flow path part S102, flows through the outer ring side flow path part S102 as it is. An outer portion in the radial direction of the scroll 10 is thereby cooled.

As mentioned above, after the second cooling medium CA2 flows through the scroll cooling flow path S10, the second cooling medium CA2 is discharged through the cooling medium discharge ports K30a, K30b formed at the scroll 10. Here, one branched cooling medium CA2a is discharged from one cooling medium discharge port K30a, and the other branched cooling medium CA2b is discharged from the other cooling medium discharge port K30b. The second cooling medium CA2 discharged from the cooling medium discharge ports K30a, K30b flows around the scroll 10 in the second accommodation space part S131b.

The second cooling medium CA2 flows from the second accommodation space part S131b to the outside through the cooling medium discharge port 123c. For example, the second cooling medium CA2 is used sequentially to cool the stator blades 132a that form each turbine stage.

[Operation and Effect]

As mentioned above, in this embodiment, the first cooling medium CA1 is supplied to the combustor cooling flow path S120 and is used for cooling the combustor 120. The second cooling medium CA2, which is lower in temperature than the first cooling medium CA1, is supplied to the scroll cooling flow path S10 without passing through the combustor cooling flow path S120 and is used for cooling the scroll 10. In this embodiment, since the dividing part 40 is provided at the scroll inner cylinder 20, the second cooling medium CA2 flows by bifurcating into the inner ring side flow path part S104 located inside in the radial direction and the outer ring side flow path part S102 located outside in the radial direction by the dividing part 40, as in the case of the first embodiment. As a result, in this embodiment, the second cooling medium CA2 can be sufficiently supplied to the inner ring side flow path part S104, as in the case of the first embodiment.

In this embodiment, reliability of the scroll 10 can be improved because a portion located outside in the radial direction in the scroll 10 and a portion located inside in the radial direction in the scroll 10 can be effectively cooled.

Fourth Embodiment

[Configuration]

Figure 6:
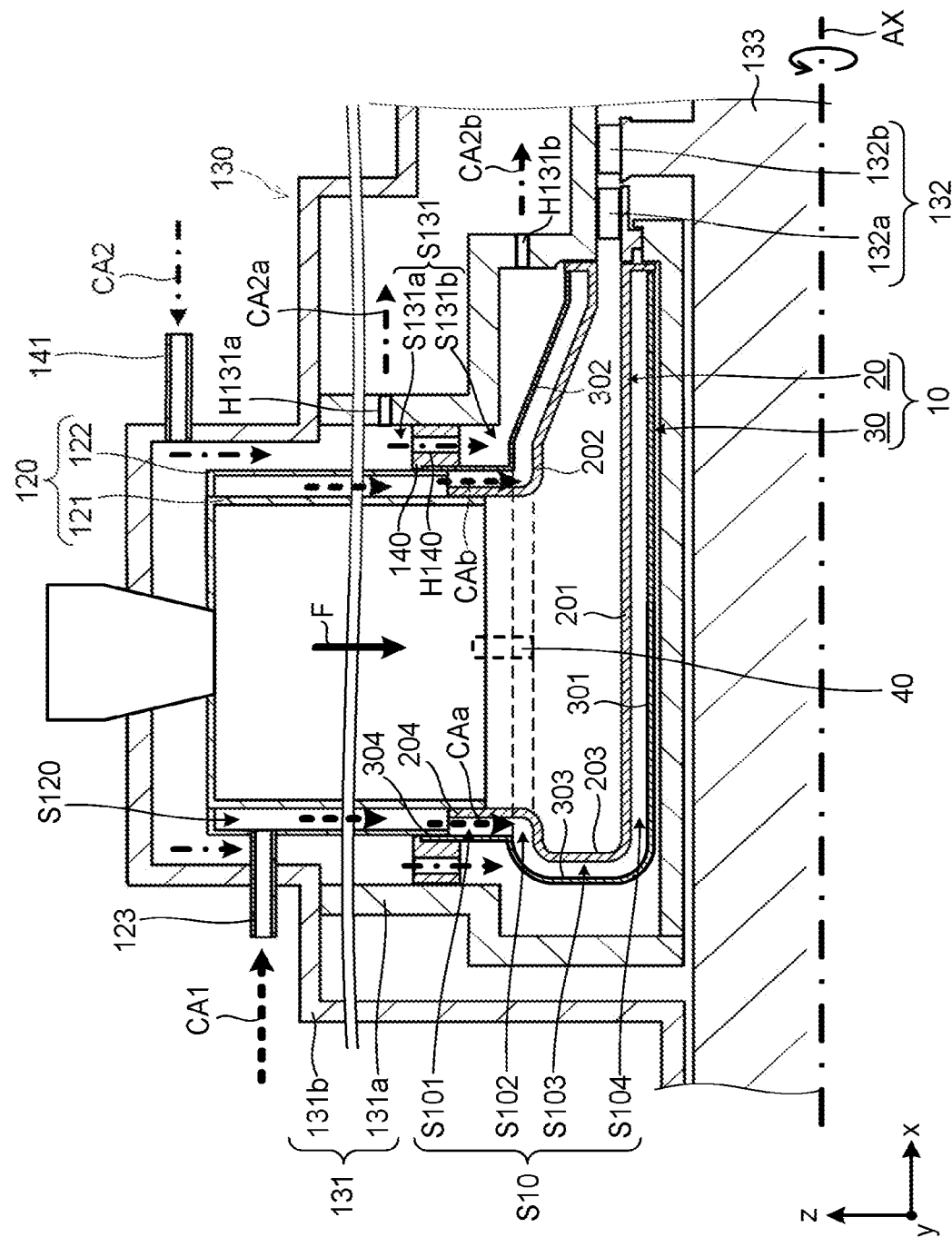
FIG. 6 is a diagram illustrating a substantial part of a gas turbine facility according to a fourth embodiment.

The gas turbine facility 100 according to a fourth embodiment is explained by using FIG. 6.

FIG. 6 schematically illustrates a part of a cross-section along the vertical plane (xz plane), as in FIG. 1A.

As illustrated in FIG. 6, the gas turbine facility 100 of this embodiment is configured so that the first cooling medium CA1 (shown in a dashed line) and the second cooling medium CA2 (shown in a dot and dash line) are supplied as the cooling medium, unlike the case of the first embodiment (refer to FIG. 1A). Further, an accommodation space dividing part 140 is provided. Except in this and related respects, this embodiment is similar to the case of the first embodiment. For this reason, overlapping items are omitted from the explanation as appropriate.

The accommodation space dividing part 140 is installed at the accommodation space S131 (combustor and scroll accommodation space). The accommodation space dividing part 140 divides the accommodation space S131 into a first accommodation space part S131a located on an upstream side and a second accommodation space part S131b located on a downstream side in a flow direction of the cooling medium CA2. Here, the accommodation space dividing part 140 is, for example, a ring-shaped dividing plate that surrounds the combustor outer cylinder 122 and the outer cylinder introduction pipe part 304 that forms the scroll outer cylinder 30.

The accommodation space dividing part 140 is provided with connecting holes H140 that connect between the first accommodation space part S131a and the second accommodation space part S131b. The connecting holes H140 are plural, and the plurality of connecting holes H140 are arranged around the combustor outer cylinder 122 and around the outer cylinder introduction pipe part 304 that forms the scroll outer cylinder 30.

[Flows of First Cooling Medium CA1 and Second Cooling Medium CA2]

Details of the first cooling medium CA1 and the second cooling medium CA2 are explained in turn.

(First Cooling Medium CA1)

In this embodiment, the first cooling medium CA1 is $CO_2$ gas, for example, as in the first embodiment, and is supplied from the combustor cooling flow path S120 to the scroll cooling flow path S10 after being supplied from the cooling medium supply pipe 123 to the combustor cooling flow path S120.

(Second Cooling Medium CA2)

In this embodiment, the second cooling medium CA2 is $CO_2$ gas, for example, with a temperature lower than the first cooling medium CA1 and a pressure higher than the first cooling medium CA1.

The second cooling medium CA2 is first supplied from the cooling medium supply pipe 141 to the first accommodation space part S131a of the accommodation space S131 (combustor and scroll accommodation space). The second cooling medium CA2 flowing into the first accommodation space part S131a flows around the combustor outer cylinder 122. In the first accommodation space part S131a, a part of the second cooling medium CA2 is discharged from the first accommodation space part S131a through a first discharge hole H131a before it flows into the connecting holes H140 of the accommodation space dividing part 140.

The remaining part of the second cooling medium CA2 flows from the first accommodation space part S131a to the second accommodation space part S131b through the connecting holes H140. The second cooling medium CA2, which flows into the second accommodation space part S131b, flows around the scroll outer cylinder 30. In the second accommodation space part S131b, the second cooling medium CA2 is discharged from the second accommodation space part 131b through a second discharge hole H131b.

In this embodiment, the second cooling medium CA2 flows from the first accommodation space part S131a into the second accommodation space part S131b through the connecting holes H140 of the accommodation space dividing part 140. The second cooling medium CA2 that flows into the second accommodation space part S131b has a pressure lower than the second cooling medium CA2 that flows into the first accommodation space part S131a due to resistance of the connecting holes H140.

As a result, the second cooling medium CA2 (CA2a), which is discharged from the first accommodation space part S131a through the first discharge hole H131a, is discharged at a high pressure. On the other hand, the second cooling medium CA2 (CA2b), which is discharged from the second accommodation space part S131b through the second discharge hole H131b, is discharged at a pressure lower than the second cooling medium CA2 (CA2a), which is discharged through the first discharge hole H131a.

Although not illustrated, the second cooling medium CA2 (CA2a) discharged through the first discharge hole H131a is used, for example, to cool the stator blades 132a forming a high-pressure stage (upstream side turbine stage) among the plurality of turbine stages 132. The second cooling medium CA2 (CA2b) discharged through the second discharge hole H131b is used, for example, to cool the stator blades 132a forming a low-pressure stage (downstream side turbine stage) among the plurality of turbine stages 132. Thus, it is possible to efficiently cool the stator blades 132a of each turbine stage 132.

[Operation and Effect]

As mentioned above, in this embodiment, the second cooling medium CA2 that flows into the second accommodation space part S131b has a pressure lower than the second cooling medium CA2 that flows into the first accommodation space part S131a due to the resistance of the connecting holes H140. The scroll 10 is accommodated in the second accommodation space part S131b. In this embodiment, a load applied to the scroll 10 due to the second cooling medium CA2 can be therefore lowered. As a result, deformation or the like of the scroll 10 can be effectively prevented. It should be noted that the combustor 120 accommodated in the first accommodation space part S131a has a simple cylindrical structure and is more resistant to damage than the scroll 10 under the load caused by differential pressure.

In this embodiment, a periphery of the scroll inner cylinder 20 is cooled by using the first cooling medium CA1, which has a temperature higher than the second cooling medium CA2, unlike the third embodiment. A temperature difference between the inside and the outside of the scroll inner cylinder 20 becomes smaller than in the third embodiment. As a result, in this embodiment, thermal stress generated in the scroll inner cylinder 20 can be reduced.

Further, in this embodiment, the second cooling medium CA2 flows sequentially around the combustor outer cylinder 122 and around the scroll outer cylinder 30 in the accommodation space S131. Thus, in this embodiment, the combustor outer cylinder 122 and the scroll outer cylinder 30 can be effectively cooled.

Fifth Embodiment

[Configuration]

Figure 7:
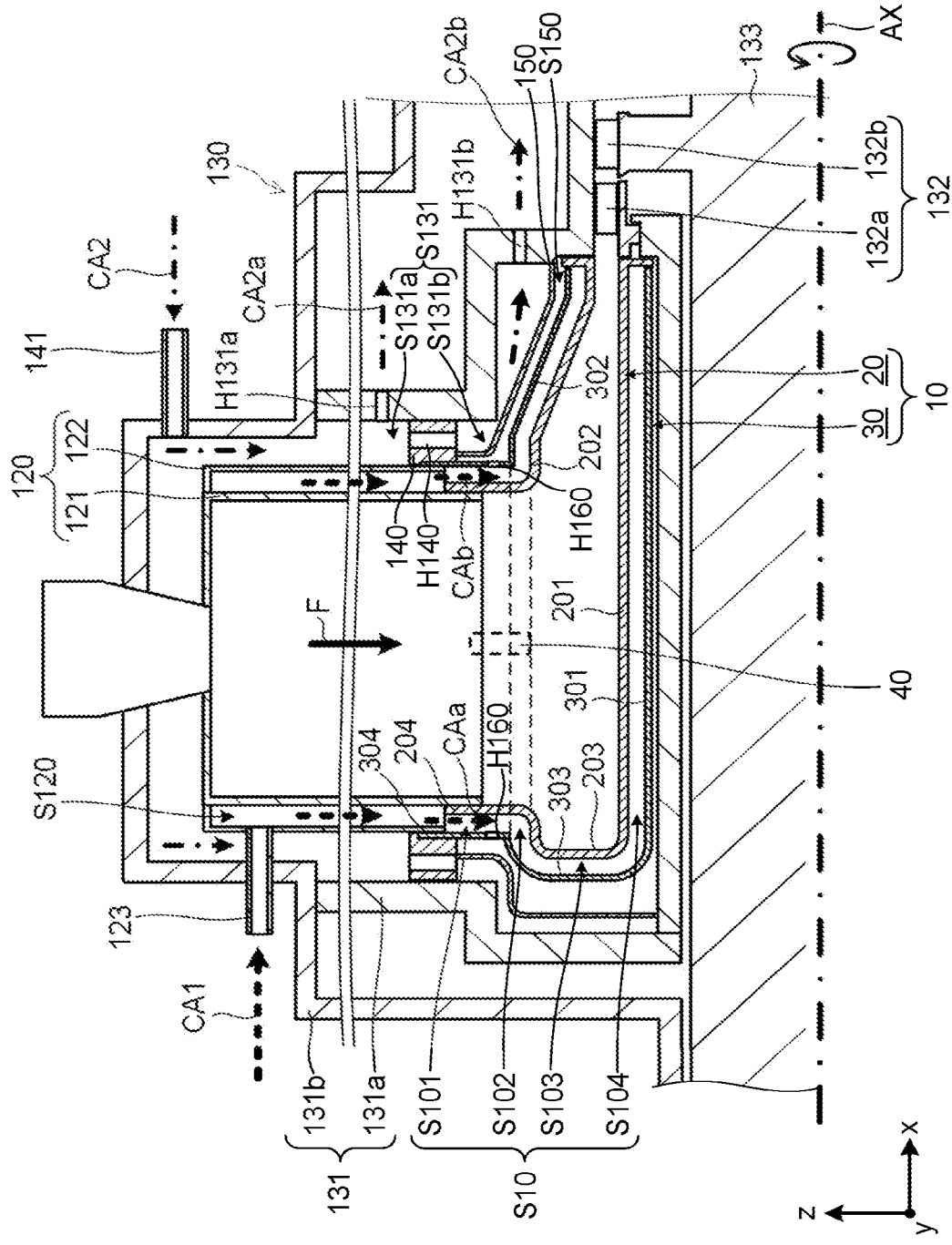
FIG. 7 is a diagram illustrating a substantial part of a gas turbine facility according to a fifth embodiment.
Figure 8A:
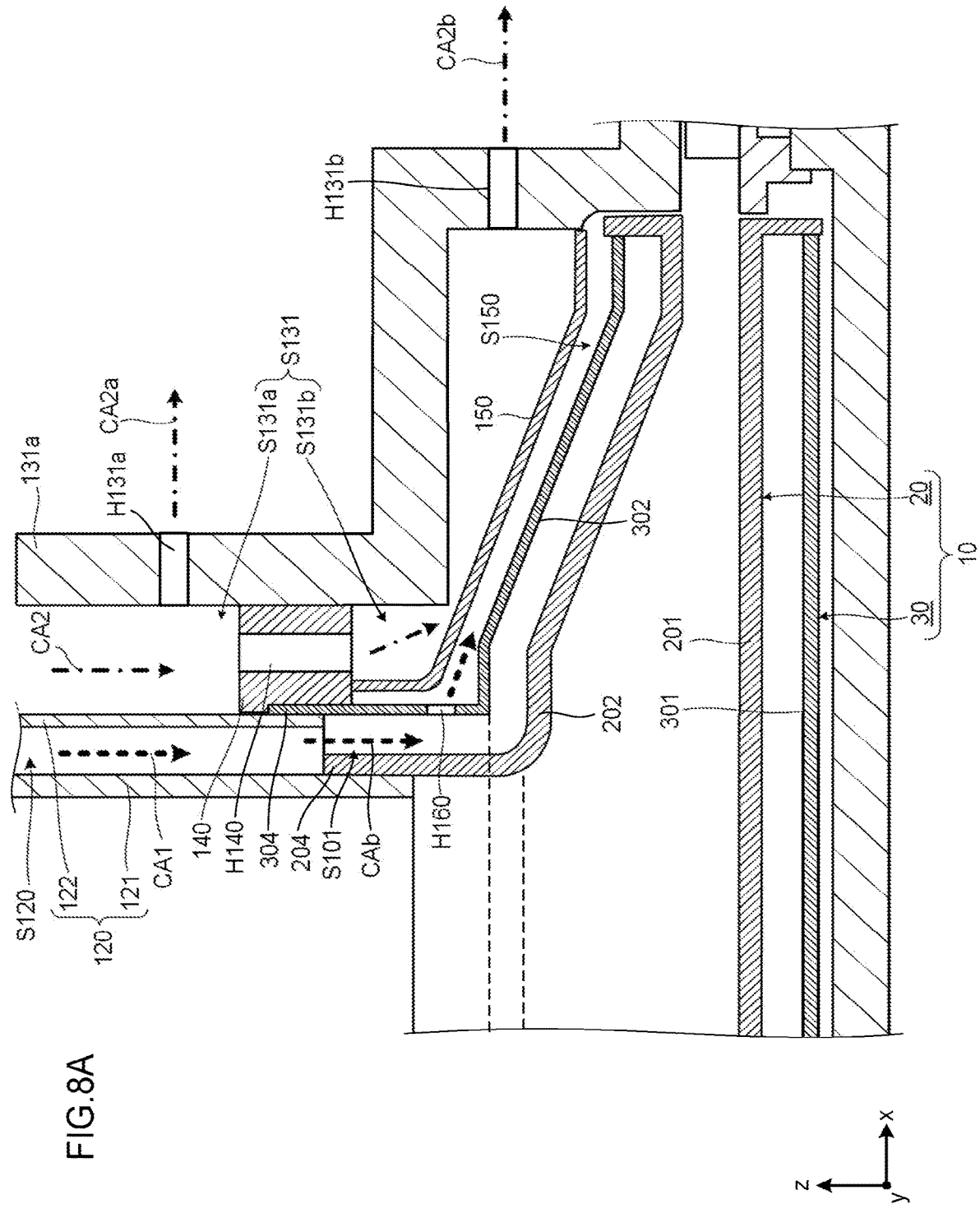
FIG. 8A is a diagram illustrating the substantial part of the gas turbine facility according to the fifth embodiment.

The gas turbine facility 100 according to a fifth embodiment is explained by using FIG. 7, FIG. 8A, and FIG. 8B.

FIG. 7 schematically illustrates a part of a cross-section along the vertical plane (xz plane), as in FIG. 6. FIG. 8A and FIG. 8B each enlargedly illustrate a part of FIG. 7. FIG. 8A enlargedly illustrates a right side portion of the scroll 10 in FIG. 7. On the other hand, FIG. 8B enlargedly illustrates a left side portion of the scroll 10 in FIG. 7.

The gas turbine facility 100 of this embodiment has a cover part 150 and is provided with pressure relief holes H160 as illustrated in FIG. 7, FIG. 8A, and FIG. 8B. Except in this and related respects, this embodiment is similar to the case of the first embodiment. For this reason, overlapping items are omitted from the explanation as appropriate.

In this embodiment, the cover part 150 is provided to cover the entire scroll outer cylinder 30 with a cover part space S150 therebetween. That is, the cover part 150 is installed to divide the cover part space S150 from the second accommodation space part S131b of the accommodation space S131 (combustor and scroll accommodation space).

A plurality of pressure relief holes H160 are provided at the scroll outer cylinder 30. The pressure relief holes H160 connect between the scroll cooling flow path S10 located inside the scroll outer cylinder 30 and the cover part space S150 located outside the scroll outer cylinder 30.

[Flows of First Cooling Medium CA1 and Second Cooling Medium CA2]

Details of the first cooling medium CA1 and the second cooling medium CA2 are explained in turn.

(First Cooling Medium CA1)

In this embodiment, after the first cooling medium CA1 is supplied from the cooling medium supply pipe 123 to the combustor cooling flow path S120, it is supplied from the combustor cooling flow path S120 to the scroll cooling flow path S10, as in the case of the fourth embodiment.

In this embodiment, the pressure relief holes H160 are provided at the scroll outer cylinder 30 as mentioned above. In this embodiment, a part of the first cooling medium CA1 which is supplied to the scroll cooling flow path S10 flows from the scroll cooling flow path S10 into the cover part space S150 through the pressure relief holes H160.

(Second Cooling Medium CA2)

In this embodiment, the second cooling medium CA2 is supplied from the cooling medium supply pipe 141 to the accommodation space S131, as in the case of the fourth embodiment. In the accommodation space S131, the second cooling medium CA2 is sequentially supplied to the first accommodation space part S131a, and the second accommodation space part S131b Specifically, a part of the second cooling medium CA2 which flows into the first accommodation space part S131a flows around the combustor outer cylinder 122 before flowing into the connecting holes H140 of the accommodation space dividing pat 140. A part of the second cooling medium CA2 is discharged from the first accommodation space part S131a through the first discharge hole H131a.

The remaining part of the second cooling medium CA2 which flows into the first accommodation space part S131a flows into the second accommodation space part S131b. The second cooling medium CA2 which flows into the second accommodation space part S131b is discharged from the second accommodation space part S131b through the second discharge hole H131b. At this time, the second cooling medium CA2 flows around the scroll outer cylinder 30 through the cover part space S150 and the cover part 150.

[Operation and Effect]

As mentioned above, in this embodiment, since the cover part 150 is provided to cover the scroll outer cylinder 30 with the cover part space S150 therebetween, the second cooling medium CA2 is not directly in contact with a periphery of the scroll outer cylinder 30. In this embodiment, a load applied to the scroll 10 by the second cooling medium CA2 can be thereby lowered. As a result, deformation or the like of the scroll 10 can be effectively prevented.

Sixth Embodiment

[Configuration]

Figure 9:
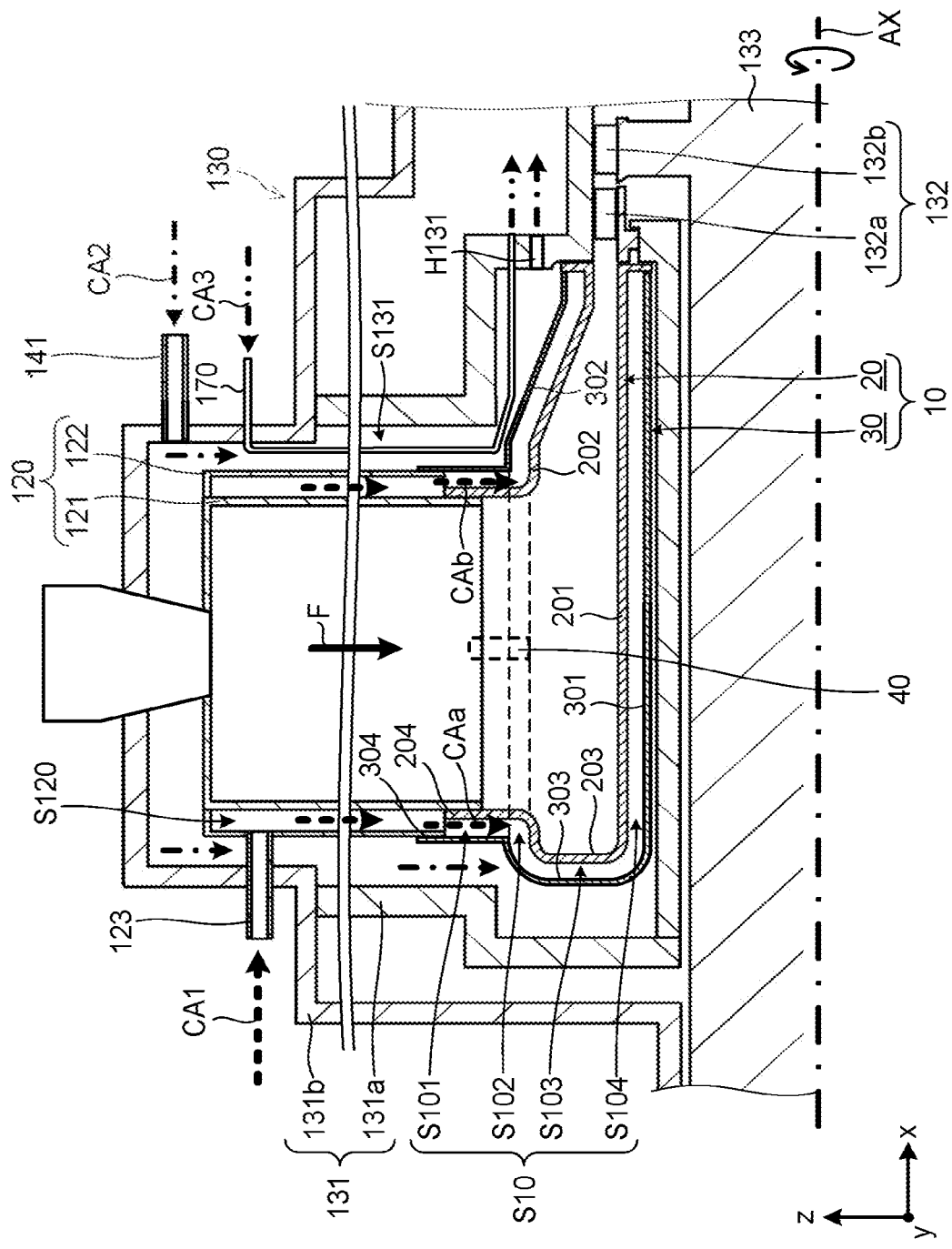
FIG. 9 is a diagram illustrating a substantial part of a gas turbine facility according to a sixth embodiment.

The gas turbine facility 100 according to a sixth embodiment is explained by using FIG. 9.

FIG. 9 schematically illustrates a part of a cross-section along the vertical plane (xz plane) as in FIG. 6.

As illustrated in FIG. 9, the gas turbine facility 100 of this embodiment is configured so that a third cooling medium CA3 (shown in a two-dot and dash line) is supplied in addition to the first cooling medium CA1 (shown in a dashed line) and the second cooling medium CA2 (shown in a dot and dash line) as the cooling medium, unlike the case of the fourth embodiment (refer to FIG. 6). In this embodiment, the accommodation space dividing part 140 (refer to FIG. 6) is not provided, unlike the fourth embodiment, and a cooling supply pipe 170 is provided. Except in this and related respects, this embodiment is similar to the case of the first embodiment. For this reason, overlapping items are omitted from the explanation as appropriate.

In this embodiment, the cooling supply pipe 170 includes a portion that is accommodated in the accommodation space S131 (combustor and scroll accommodation space) and is configured so that the third cooling medium CA3 flows through the cooling supply pipe 170.

[Flows of First Cooling Medium CA1, Second Cooling Medium CA2, and Third Cooling Medium CA3]

Details of the first cooling medium CA1, the second cooling medium CA2, and the third cooling medium CA3 are explained in turn.

(First Cooling Medium CA1)

In this embodiment, the first cooling medium CA1 is supplied from the combustor cooling flow path S120 to the scroll cooling flow path S10 after being supplied from the cooling medium supply pipe 123 to the combustor cooling flow path S120, as in the case of the fourth embodiment.

(Second Cooling Medium CA2)

In this embodiment, the second cooling medium CA2 has a temperature lower than the first cooling medium CA1 and a pressure higher than the first cooling medium CA1, as in the case of the fourth embodiment.

The second cooling medium CA2 is supplied from the cooling medium supply pipe 141 to the accommodation space S131. In the accommodation space S131, the second cooling medium CA2 flows around the combustor outer cylinder 122 and around the scroll outer cylinder 30. The second cooling medium CA2 is discharged from the accommodation space S131 through the discharge hole H131.

Although not illustrated, the second cooling medium CA2 discharged through the discharge hole H131 is used to cool the stator blades 132a forming a low-pressure stage (downstream side turbine stage) among the plurality of turbine stages 132, for example.

(Third Cooling Medium CA3)

In this embodiment, the third cooling medium CA3 has a pressure higher than the first cooling medium CA1 and the second cooling medium CA2. The temperature of the third cooling medium CA3 can be arbitrary set depending on adjustment of a supply-side. That is, the temperature of the third cooling medium CA3 may be different from the temperature of the first cooling medium CA1 and the temperature of the second cooling medium CA2.

The third cooling medium CA3 flows into the inside of the cooling supply pipe 170 through an inlet and flows to the outside of the cooling supply pipe 170 through an outlet. The third cooling medium CA3 flows to the outside with the pressure higher than the first cooling medium CA1 and the second cooling medium CA2.

Although not illustrated, the third cooling medium CA3 which is discharged from the outlet of the cooling supply pipe 170 is used to cool the stator blades 132a forming a high-pressure stage (upstream side turbine stage) among the plurality of turbine stages 132, for example.

[Operation and Effect]

As mentioned above, in this embodiment, the accommodation space dividing part 140 (refer to FIG. 6) is not provided, unlike the case of the fourth embodiment. The pressure of the second cooling medium CA2 flowing around the combustor outer cylinder 122 in the accommodation space S131 of this embodiment is therefore lower than the case of the fourth embodiment. Since the load applied to the combustor 120 is lowered according thereto, a thickness of the combustor inner cylinder 121 and a thickness of the combustor outer cylinder 122 can be reduced.

OTHERS

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

REFERENCE SIGNS LIST

10 . . . scroll, 20 . . . scroll inner cylinder, 21 . . . first scroll inner cylinder part, 22 . . . second scroll inner cylinder part, 30 . . . scroll outer cylinder, 40 . . . dividing part, 40a . . . first flange part, 40b . . . second flange part, 100 . . . gas turbine facility, 100J . . . gas turbine facility, 120 . . . combustor, 121 . . . combustor inner cylinder, 122 . . . combustor outer cylinder, 123 . . . cooling medium supply pipe, 123a . . . first cooling medium supply pipe, 123b . . . second cooling medium supply pipe, 123c . . . cooling medium discharge port, 130 . . . turbine part, 131 . . . turbine casing, 131a . . . inner casing, 131b . . . outer casing, 132 . . . turbine stage, 132a . . . stator blade, 132b . . . rotor blade, 133 . . . turbine rotor, 140 . . . accommodation space dividing part, 150 . . . cover part, 170 . . . cooling supply pipe, 201 . . . inner cylinder inner ring part, 202 . . . inner cylinder outer ring part, 202a . . . first inner cylinder outer ring member, 202b . . . second inner cylinder outer ring member, 203 . . . inner cylinder side plate part, 204 . . . inner cylinder introduction pipe part, 204a . . . first inner cylinder introduction pipe member, 204b . . . second inner cylinder introduction pipe member, 301 . . . outer cylinder inner ring part, 302 . . . outer cylinder outer ring part, 303 . . . outer cylinder side plate part, 304 . . . outer cylinder introduction pipe part, 304F . . . outer cylinder introduction pipe flow guide part, 401 . . . bolt, AX . . . rotation axis, CA . . . cooling medium, CA1 . . . first cooling medium, CA2 . . . second cooling medium, CA3 . . . third cooling medium, CA2a . . . branched cooling medium, CA2b . . . branched cooling medium, CAa . . . branched cooling medium, CAb . . . branched cooling medium, F . . . working medium, K30a cooling medium discharge port, K30b . . . cooling medium discharge port, S10 . . . scroll cooling flow path, S101 . . . introduction flow path part, S102 . . . outer ring side flow path part, S103 . . . side surface side flow path part, S104 . . . inner ring side flow path part, S120 . . . combustor cooling flow path, S131a . . . first accommodation space part, S131b . . . second accommodation space part, S131 . . . accommodation space (combustor and scroll accommodation space), H131a . . . first discharge hole, H131b . . . second discharge hole, H140 . . . connecting hole, S150 . . . cover part space, H160 . . . pressure relief hole

What is claimed is:

1. A scroll which leads combustion gas to a turbine stage as a working medium for driving a turbine rotor in a gas turbine facility, the scroll comprising:
a scroll inner cylinder into which the working medium flows; and
a scroll outer cylinder which is provided to cover the scroll inner cylinder with a scroll cooling flow path where a cooling medium with a temperature lower of the working medium is supplied between the scroll inner cylinder and the scroll outer cylinder, wherein
the scroll cooling flow path includes:
an inner ring side flow path part located on an inner side of the scroll inner cylinder in a radial direction of the turbine rotor;
an outer ring side flow path part located on an outer side of the scroll inner cylinder in the radial direction of the turbine rotor; and
a dividing part provided at the scroll inner cylinder, dividing the outer ring side flow path part in an axial direction along a rotation axis of the turbine rotor,
the dividing part divides the outer ring side flow path part into a first space located on an upstream side of the working medium and a second space located on a downstream side of the working medium, and the cooling medium is introduced into the outer ring side flow path part along the radial direction and is divided into the first space and the second space by the dividing part.

2. The scroll according to claim 1, wherein the scroll inner cylinder is dividable into:
- a first scroll inner cylinder part provided with a first flange part; and
- a second scroll inner cylinder part provided with a second flange part, and configured by combining the first scroll inner cylinder part and the second scroll inner cylinder part, and the dividing part is configured by combining the first flange part and the second flange part.

3. The scroll according to claim 1, further comprising:
cooling medium discharge ports through which the cooling medium is discharged from the scroll cooling flow path to the outside, wherein
the cooling medium discharge ports are provided on one end side located on a turbine stage side in the scroll outer cylinder.

4. A gas turbine facility including the scroll according to claim 3, comprising:
a combustor which produces the combustion gas, wherein the cooling medium includes:
- a first cooling medium; and
- a second cooling medium with a temperature lower than the first cooling medium, the combustor includes:
- a combustor inner cylinder which introduces the combustion gas into the scroll inner cylinder as the working medium; and
- a combustor outer cylinder which is provided to cover the combustor inner cylinder with a combustor cooling flow path where the first cooling medium is supplied between the combustor inner cylinder and the combustor outer cylinder, and the second cooling medium is configured to be discharged through the cooling medium discharge ports after being supplied to the scroll cooling flow path without passing through the combustor cooling flow path.

5. A gas turbine facility including the scroll according to claim 1, comprising:
a combustor which produces the combustion gas, wherein the combustor includes:
- a combustor inner cylinder which is connected to the scroll inner cylinder; and
- a combustor outer cylinder which is connected to the scroll outer cylinder, and provided to cover the combustor inner cylinder with a combustor cooling flow path where the cooling medium is supplied between the combustor inner cylinder and the combustor outer cylinder, the combustion gas is configured to be introduced from the combustor inner cylinder into the scroll inner cylinder as the working medium, and
the cooling medium is configured to be introduced into the scroll cooling flow path after passing through the combustor cooling flow path.

6. The gas turbine facility according to claim 5, further comprising:
a turbine casing which accommodates the scroll and the combustor into a combustor and scroll accommodation space, wherein
the cooling medium includes:
- a first cooling medium; and
- a second cooling medium with a temperature lower than the first cooling medium, the first cooling medium is configured to be introduced into the scroll cooling flow path after passing through the combustor cooling flow path, and
the second cooling medium is configured to flow sequentially around the combustor outer cylinder and around the scroll outer cylinder in the combustor and scroll accommodation space.

7. The gas turbine facility according to claim 6, further comprising:
an accommodation space dividing part which divides the combustor and scroll accommodation space into a first accommodation space part located on an upstream side in a flow direction of the second cooling medium and a second accommodation space part located on a downstream side, wherein
the accommodation space dividing part is provided with connecting holes which connect between the first accommodation space part and the second accommodation space part,
the second cooling medium flowing into the first accommodation space part is configured to be discharged from the first accommodation space part through a first discharge hole before flowing into the connecting holes,
the second cooling medium flowing from the first accommodation space part into the second accommodation space part through the connecting holes is continued to be discharged from the second accommodation space part through a second discharge hole, and
a pressure of the second cooling medium discharged through the first discharge hole is lower than a pressure of the second cooling medium discharged through the second discharge hole.

8. The gas turbine facility according to claim 7, further comprising:
a cover part which is provided to cover the scroll outer cylinder with a cover part space between the scroll outer cylinder and the cover part, wherein
the first cooling medium is configured to be supplied from the scroll cooling flow path to the cover part space through pressure relief holes.

9. The gas turbine facility according to claim 6, further comprising:
a cooling supply pipe where a third cooling medium with a pressure higher than the first cooling medium and the second cooling medium flows, wherein
the cooling supply pipe includes a portion accommodated in the combustor and scroll accommodation space.

10. The scroll according to claim 1, wherein a branched cooling medium which has branched into the first space flows into the inner ring side flow path part.

* * * * *